United States Patent
Ozawa et al.

[19]

[11] Patent Number: 6,064,139
[45] Date of Patent: May 16, 2000

[54] ULTRASONIC MOTOR

[75] Inventors: Fujio Ozawa; Takashi Sato; Masao Kasuga; Shuji Otawa, all of Tokyo, Japan

[73] Assignee: Seiko Instruments Inc., Japan

[21] Appl. No.: 08/321,581

[22] Filed: Oct. 11, 1994

Related U.S. Application Data

[63] Continuation of application No. 07/938,178, filed as application No. PCT/JP92/00383, Mar. 27, 1992, abandoned.

[30] Foreign Application Priority Data

Apr. 26, 1991 [JP] Japan .................................. 3-097596

[51] Int. Cl.[7] .................................................. H01L 41/08
[52] U.S. Cl. .............. 310/317; 310/323.04; 310/323.06; 310/316.02
[58] Field of Search .................................. 310/323, 328, 310/316, 317, 316.02, 323.03, 323.04, 323.06, 323.08, 323.09; 318/116

[56] References Cited

U.S. PATENT DOCUMENTS

| | | | |
|---|---|---|---|
| 4,692,649 | 9/1987 | Izukawa et al. | 310/316 |
| 5,025,186 | 6/1991 | Tsukada | 310/323 |
| 5,053,669 | 10/1991 | Saeki et al. | 310/323 |
| 5,079,470 | 1/1992 | Kasuga et al. | 310/323 |
| 5,091,670 | 2/1992 | Kawata et al. | 310/323 |
| 5,172,023 | 12/1992 | Kawai et al. | 310/323 |
| 5,189,331 | 2/1993 | Mukohjima et al. | 310/323 |
| 5,229,678 | 7/1993 | Miyazawa | 310/323 |
| 5,237,237 | 8/1993 | Ueda et al. | 310/323 |
| 5,247,220 | 9/1993 | Miyazawa et al. | 310/323 |
| 5,416,374 | 5/1995 | Inoue et al. | 310/317 |

FOREIGN PATENT DOCUMENTS

| | | |
|---|---|---|
| 04241394 | 4/1991 | European Pat. Off. . |
| 59-101608 | 6/1984 | Japan . |
| 59-106886 | 6/1984 | Japan . |
| 59-107309 | 6/1984 | Japan . |

OTHER PUBLICATIONS

Patent Abstracts of Japan, vol. 011, No. 346 (E–556) Nov. 12, 1987.

*Primary Examiner*—Mark O. Budd
*Attorney, Agent, or Firm*—Adams & Wilks

[57] ABSTRACT

An ultrasonic motor capable of being accurately step-driven comprises a vibrating member piezoelectrically vibrated for driving and halting a movable member. A driving wave is generated for vibrating the vibrating member to drive the movable member, and a halting wave is generated for vibrating the vibrating member to halt the movable member. The driving wave can be either a travelling wave or a standing wave, and the halting wave is a standing wave. The movable member is divided into a plurality of portions, and when the vibrating member is driven by the halting wave, the portions of the movable member become centered at respective nodal portions of the standing halting wave, causing the movable member to stop rotating so that the ultrasonic motor can be accurately step-driven.

18 Claims, 56 Drawing Sheets

Vibrational phase

Direction of driving of the movable member

Direction of driving of the movable member

Direction of driving of the movable member

Direction of driving of the movable member

Direction of driving of the movable member

Direction of driving of the movable member

Direction of driving of the movable member

Direction of driving of the movable member

ULTRASONIC MOTOR

This is a continuation of application Ser. No. 07/938,178 filed Nov. 27, 1992 now abandoned which is a 371 of PCT/JP92/00383 filed Mar. 27, 1992.

BACKGROUND OF THE INVENTION

This invention relates to an ultrasonic motor which frictionally drives a movable member by ultrasonic vibration using streching movement of a piezoelectric vibrator.

FIG. 28 shows a conventional ultrasonic motor.

A vibrating member 3 is fastened to a center shaft 9 fixed on a bed 7. A piezoelectric vibrator 4 is bonded to the bottom face of the vibrating member 3. The piezoelectric vibrator 4 has a plurality of electrode patterns and is treated to be polarized. The piezoelectric vibrator 4 and a control circuit (not shown in the figure) are wired by a lead line 10. The projections 3*a* of the vibrating member 3 comes into contact with a movable member 2 through frictional materials 8. The movable member 2 is built into the center shaft 9 and can be rotatably supported by a bearing. The movable member 2 is urged downward by a pressure spring 1. When high frequency voltage is applied to the of piezoelectric vibrator 4, ultrasonic vibration is generated on the vibrating member 3 and the movable member 2 rotates by means of frictional force of the of frictional materials 8.

FIG. 29 is a perspective view showing an ultrasonic motor of a travelling wave type. A vibrating member 3 has a plurality of projections at equal intervals. When a piezoelectric vibrator 4 is applied with a plurality of high frequency voltage pulses having respectively different phases, a travelling wave is generated to the vibrating member 3, which rotates a movable member 2. Such a structure is disclosed in Japanese Kokai (Patent Provisional Publication) JP-A-No. 177874/1989.

FIG. 30 is a perspective view showing an ultrasonic motor of standing wave type. A vibrating member 3 has projections the number of which is relative to the number of crests of the standing wave. When one high frequency voltage is applied to a piezoelectric vibrator 4, a standing wave is generated to a vibrating member 3, which rotates a movable member 2. Such a structure is disclosed in Japanese Kokai JP-A-No. 107472/88.

As explained above, as to a piezoelectric vibrator of a conventional ultrasonic motor, an ultrasonic motor using a standing wave has only a piezoelectric vibrator which generates a standing wave in the a direction of a circumference of vibrating member. On the other hand, an ultrasonic motor using a travelling wave has only a piezoelectric vibrator which generates a travelling wave in the direction of the circumference the vibrating member. The rotation of the movable member is controlled by regulating voltage, application period, and frequency of a high frequency signal applied to the piezoelectric vibrator.

In both of the above cases, cross sections vertical to the direction of rotation of the movable members are uniform.

However, in order to perform accurate step drive such as for an analogue watch, a conventional ultrasonic motor requires rotation detecting means such as an encoder for reading the position of the movable member. This is because a feed of the movable member is not fixed when the application period of a high frequency signal is controlled simply by repeatedly switching on and off as an ultrasonic motor is frictionally driven. Therefore, in order to step-drive the movable member accurately, it is necessary to constantly monitor how much the movable member is moved so that a halt instruction can be given at the moment when the movable member reaches a desirable position. Accordingly, in the conventional ultrasonic motor, an accurate encorder is required, and there is a problem in that the movable member overruns a desirable position because of residual vibration of the vibrating member even after a halt instruction has been given.

Therefore, the object of this invention is to solve the conventional problems described above by obtaining an ultrasonic motor which accurately step-drives the movable member by simple operation without encoders.

SUMMARY OF THE INVENTION

This invention is constituted of a plurality of piezoelectric vibrators for generating a travelling wave for drive and a standing wave for halt, or for generating a standing wave for drive and a standing wave for halt. An ultrasonic vibration generating circuit, a switching circuit for changing the wave for drive and the wave for halt, and a movable member having ununiform portions when observed along a direction of the circumference are also provided. An object of this invention is to accurately step-drive the movable member without requiring the use of encoders by changing ultrasonic vibration for drive (the travelling wave or the standing wave) and standing wave vibration far halt with the switching circuit.

In the inventive ultrasonic motor, the movable member rotates while only a travelling wave is generated. Next, when only a standing wave is generated, concentrated load portions are formed on the movable member having ununiform portions on a cross section in the direction of the circumference because of the ununiform cross section. Then, each of the concentrated load portions stays at respective nodal portions of the standing wave. This occurs because while only the standing wave is generated, the concentrated load portions stay at the most stable portions, that is, the nodal portions of the standing wave.

On the other hand, while there is generated such a first type of a standing wave as each projection of a movable member is located between a maximum amplitude portion and a nodal portion of the standing wave, a movable member rotates as a force in the direction of rotation acts on the movable member. Next, while there is generated such a second type of a standing wave as each protruding portion of the movable member is located on a nodal portion of the wave, concentrated load portions are formed on a cross section in the direction of the circumference of the movable member having ununiform portions because of the ununiform cross section. Then, the respective concentrated load portions stay at each of the nodal portions of the second type of the standing wave.

When the number of uniform portions of the movable member is the same as that of nodal portions of the standing wave generated on the vibrating member, it is also possible to transmit a standing wave which is excited on the vibrating member to the movable member. Therefore, concentrated load portions of the movable member correspond with respective antinodal portions of the transmitted standing wave, and at the same time ununiform portions of the movable member correspond with respective nodal portions of the standing wave. Then, it is possible that the approximate middle position of the ununiform portion is settled on the nodal portion of the vibrating member.

As explained above, accurate step-drive can be performed without using rotation detecting means such as encoders if travelling wave or standing wave vibration for drive and standing wave vibration for halt are properly changed.

DETAILED DESCRIPTION OF THE INVENTION

Referring to the attached drawings, the present invention will be explained in further detail.

Figure 1:
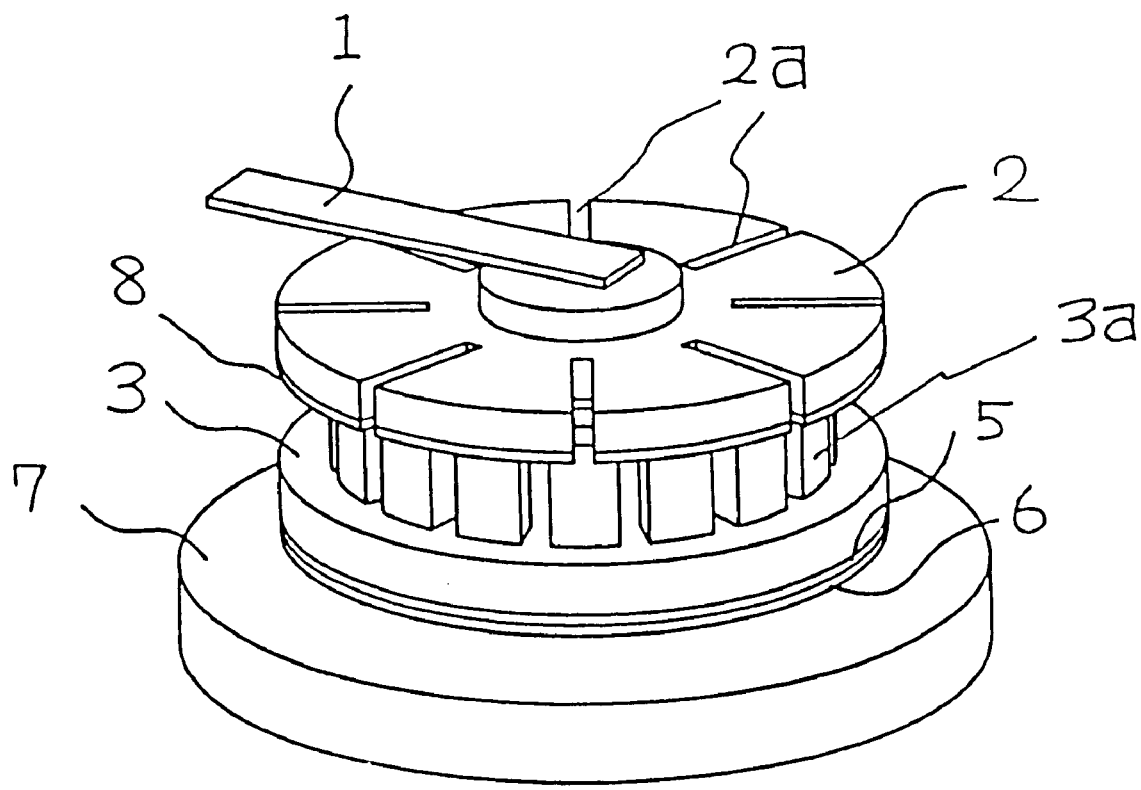
FIG. 1 is a perspective view of the first embodiment of the present invention.

FIG. 1 is a perspective view showing the first embodiment of the present invention. Conventionally, an ultrasonic motor has only a piezoelectric vibrator for drive, however, the present invention has both a piezoelectric vibrator (A) 5 for generating a travelling wave for drive and a piezoelectric vibrator (B) 6 for generating a standing wave for halt. Further, a movable member 2 has slits 2a the number of which is proper for the crest number of a standing wave generated by the piezoelectric vibrator (B) 6.

Figure 2A:
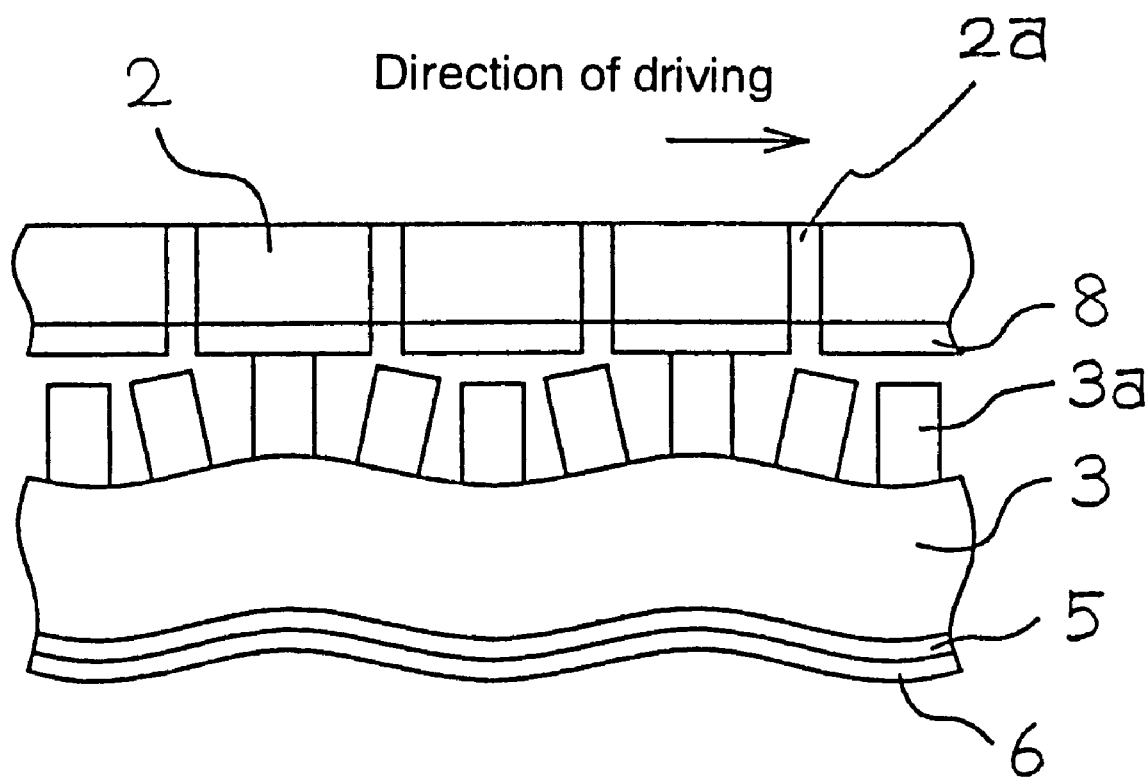
FIGS. 2(a) and (b) are sectional views respectively showing a driving status and a vibrational phase of the first embodiment of the present invention.
Figure 2B:
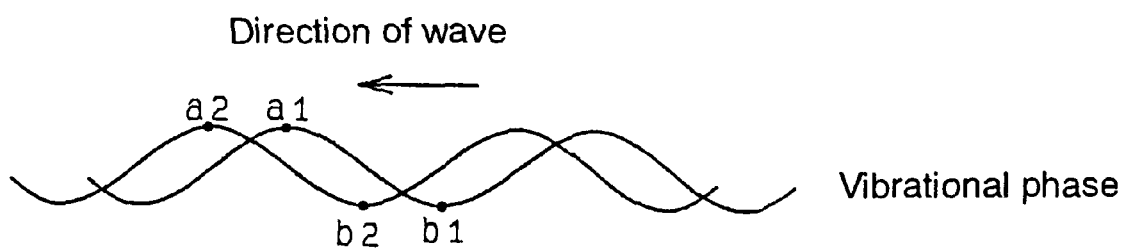

FIGS. 2(a) and (b) are sectional views respectively showing a driving status and a vibrational phase of the first embodiment show in FIG. 1. While the piezoelectric vibrator (A) 5 is generating the travelling wave for drive, there is generated on a vibrating member a travelling wave, some point of which travels from in such a manner, a1 to a2 and from b1 to b2. Therefore, the movable member 2 is driven in the direction opposite to the direction in which the wave travels.

Figure 3A:
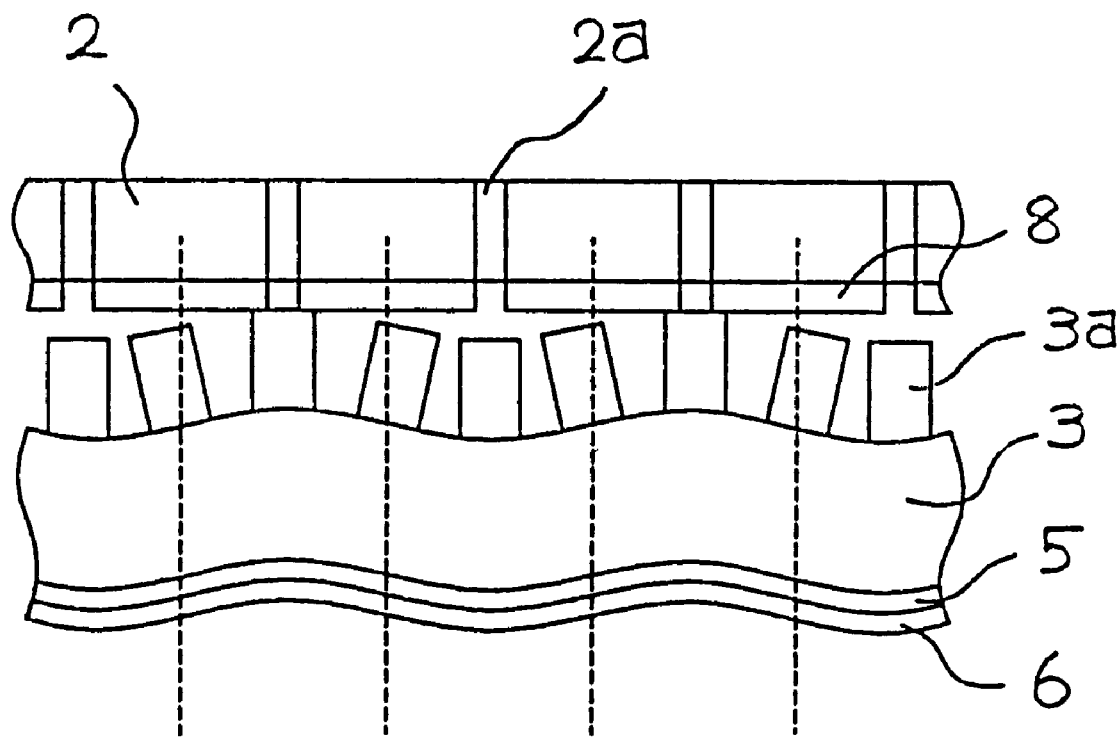
FIGS. 3(a) and (b) are sectional views respectively showing a halting status and a vibrational phase of the first embodiment of the present invention.
Figure 3B:
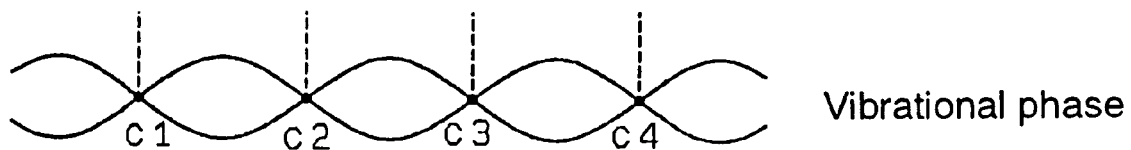

FIGS. 3(a) and (b) are sectional views respectively showing a halting status and a vibrational phase of the first embodiment shown in FIG. 1. When the piezoelectric vibrator for drive (A) 5 is stopped operating and the piezoelectric vibrator for halt (B) 6 is operated, concentrated load portions of the movable member 2 having slits 2a (i.e., the middle of two slits) halt at respective nodal portions such as c1–c4 of the standing wave generated by the piezoelectric vibrator (B) 6. As mentioned above, the movable member 2 can halt at an accurate partitioning position, if the concentrated load portions of the movable member are driven up to a close vicinity to the respective nodal portions of the standing wave for halt by the travelling wave for drive, and then the travelling wave is quickly switched to the standing wave. A preferable timing for switching the travelling wave for drive to the standing wave for halt is the moment when the concentrated load portions (the middle position between a slit and another slit) pass respective antinodal portions of the standing wave generated for halt. Additionally, though the above first embodiment is explained on the supposition that the piezoelectric vibration for drive and the piezoelectric vibrator for halt are separate, step-drive with one piezoelectric vibrator is also possible by switching polarization patterns and the positions for applying voltage.

Figure 4:
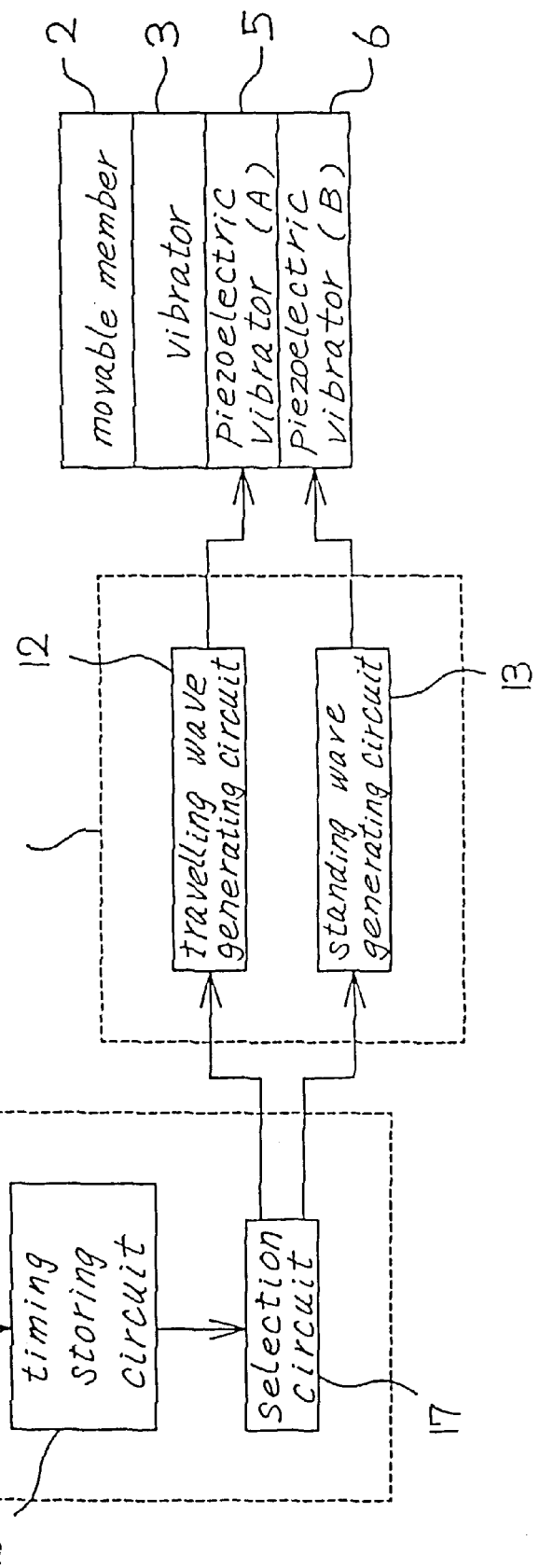
FIG. 4 is a functional block diagram of the first embodiment of the present invention.

FIG. 4 is a functional block diagram of the first embodiment of the present invention. An ultrasonic vibration generating circuit 11 having a travelling wave generating circuit 12 and a standing wave generating circuit 13 is switched by a switching circuit 14 composed of a timing circuit 15, a timing storing circuit 16, and a selection circuit 17, and either the piezoelectric vibrator (A) 5 or the piezoelectric vibrator (B) 6 is driven. Then, the vibration of the piezoelectric vibrator is magnified by the vibrator 3, and the movable member 2 is step-driven.

Figure 5:
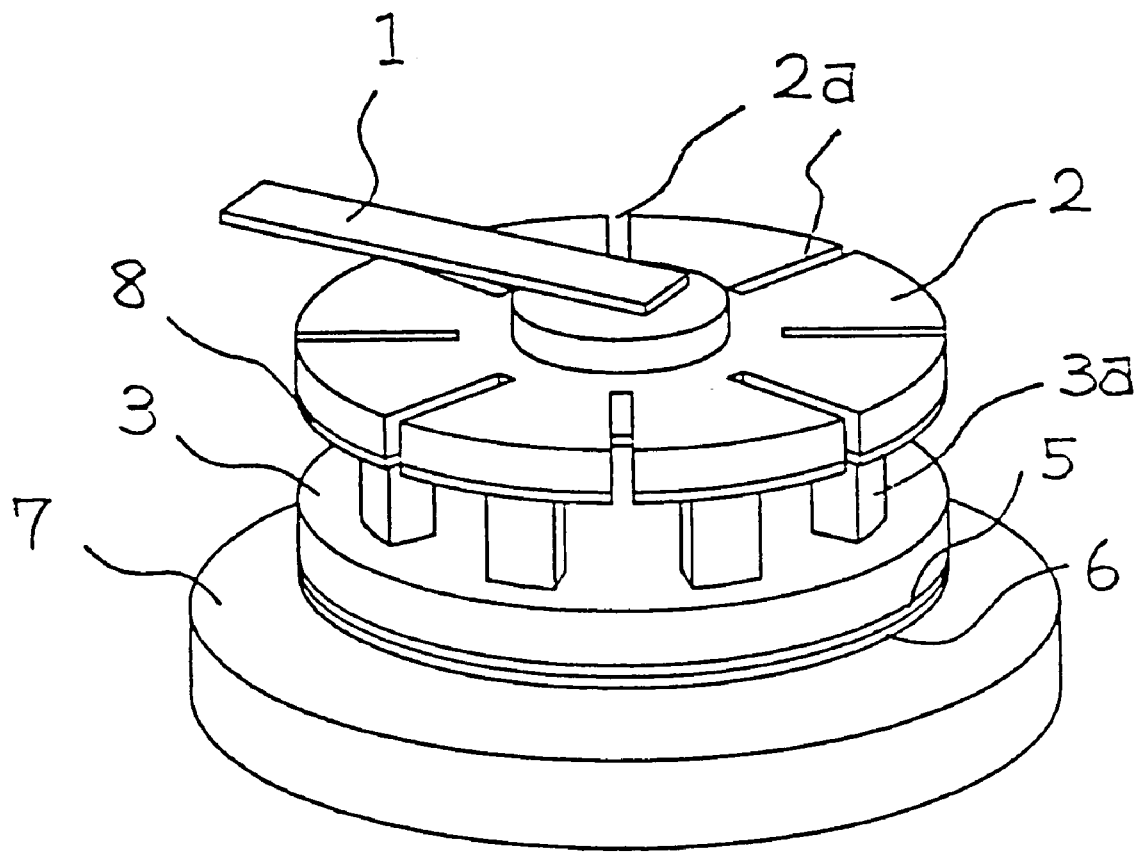
FIG. 5 is a persepective view of the second embodiment of the present invention.

FIG. 5 is a perspective view showing the second embodiment of the present invention. This embodiment also discloses a piezoelectric vibrator for drive (A) 5 and a piezoelectric vibrator for halt (B) 6, however, both of the piezoelectric vibrators (A) 5 and (B) 6 generate a standing wave. The phases of the first type of standing wave and the second type of standing wave are deviated by $\pi/4$.

Figure 6A:
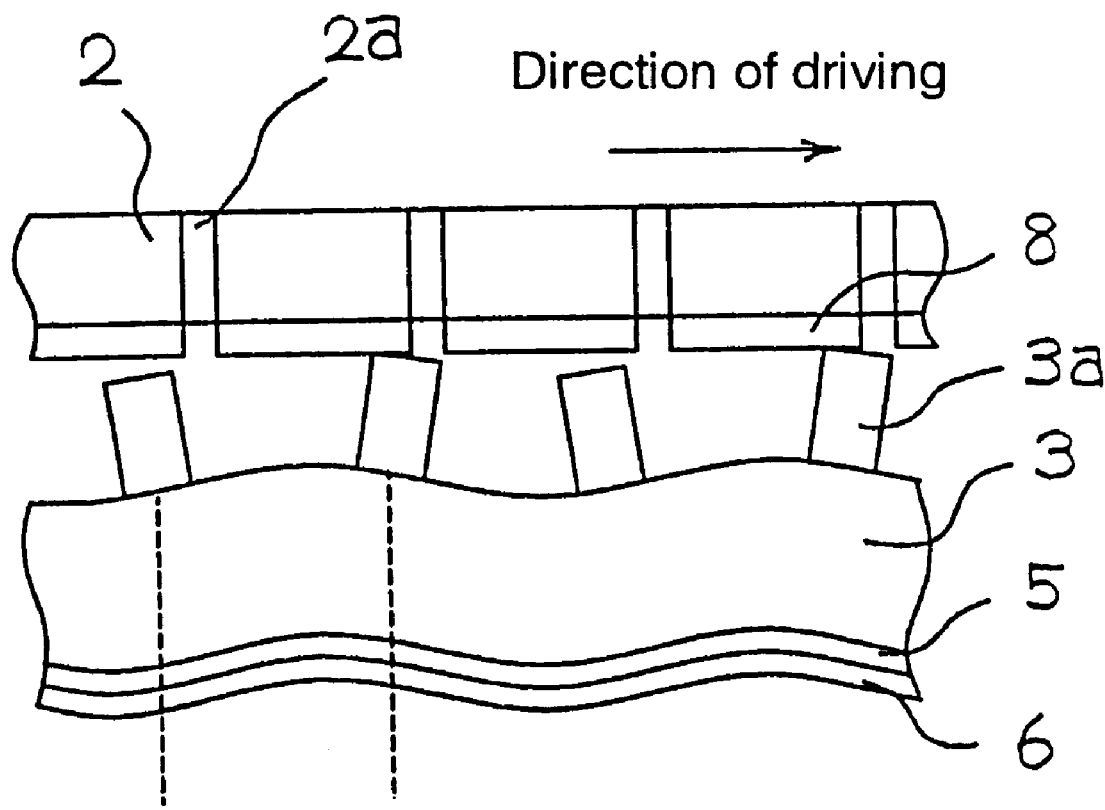
FIGS. 6(a) and (b) are sectional views respectively showing a driving status and a vibrational phase of the second embodiment of the present invention.
Figure 6B:
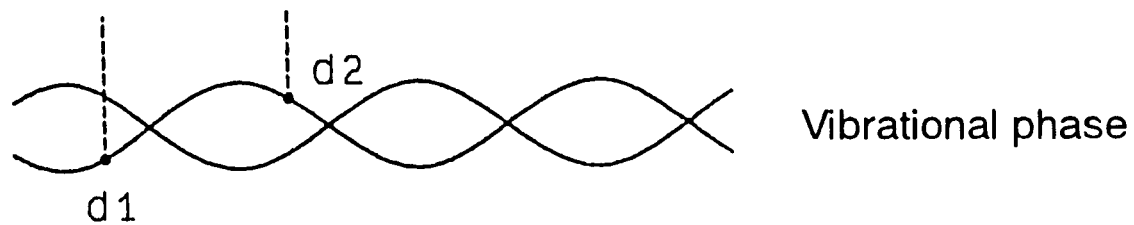

FIGS. 6(a) and (b) are sectional views respectively showing a driving status and a vibrational phase of the second embodiment shown in FIG. 5. While the piezoelectric vibrator (A) 5 generates a standing wave for drive, projections 3a of a vibrating member 3 stay between a maximum amplitude portion and a nodal portion, for example, d1 and d2. Specifically, the projections 3a are disposed at every other one of the intermediate positions between the maximum amplitude portion and the nodal portion of the standing wave for drive. Therefore, a force works in the direction of rotation, and a movable member 2 is driven.

Figure 7A:
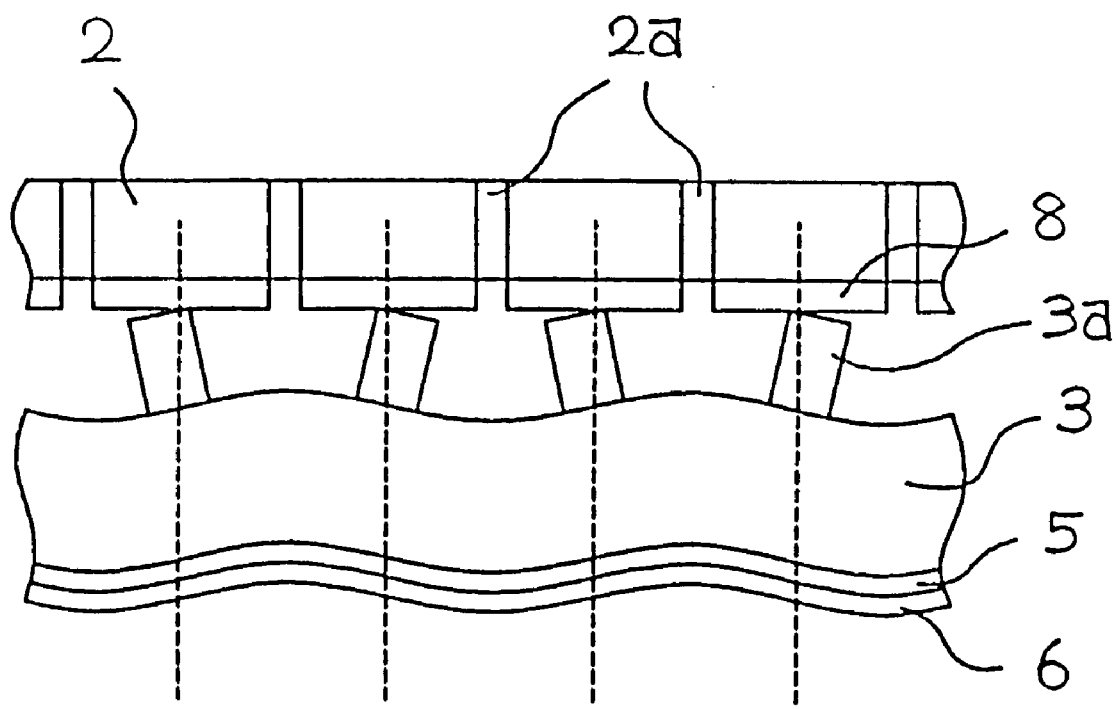
FIGS. 7(a) and (b) are sectional views respectively showing a halting status and a vibrational phase of the second embodiment of the present invention.
Figure 7B:
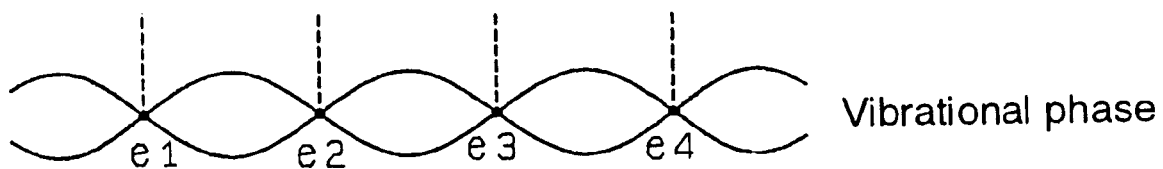

FIGS. 7(a) and (b) are sectional views respectively showing a halting status and a vibrational phase of the second embodiment shown in FIG. 5. The piezoelectric vibrator for drive (A) 5 is stopped operating and the piezoelectric vibrator for halt (B) 6 is operated. In this case, nodal portions of the a standing wave conform with respective projections 3a of the vibrating member 3. Then concentrated load portions of the movable member 2 having slits 2a (i.e., the middle of the two slits) halt at respective nodal portions e1–e4 of a standing wave generated by the piezoelectric vibrator (B) 6. As mentioned above, the movable member 2 can halt at an accurate partitioning position if the concentrated load portions are driven up to a close vicinity to the respective nodal portions of the standing wave for halt by the standing wave for drive, and the standing wave for drive is quickly switched to the standing wave for halt. Additionally, though the above second embodiment is explained on the supposition that the piezoelectric vibrator for drive and the piezoelectric vibrator for halt are separate, step-drive with one piezoelectric vibrator is also possible by switching polarization patterns and the positions for applying voltage.

Figure 8:
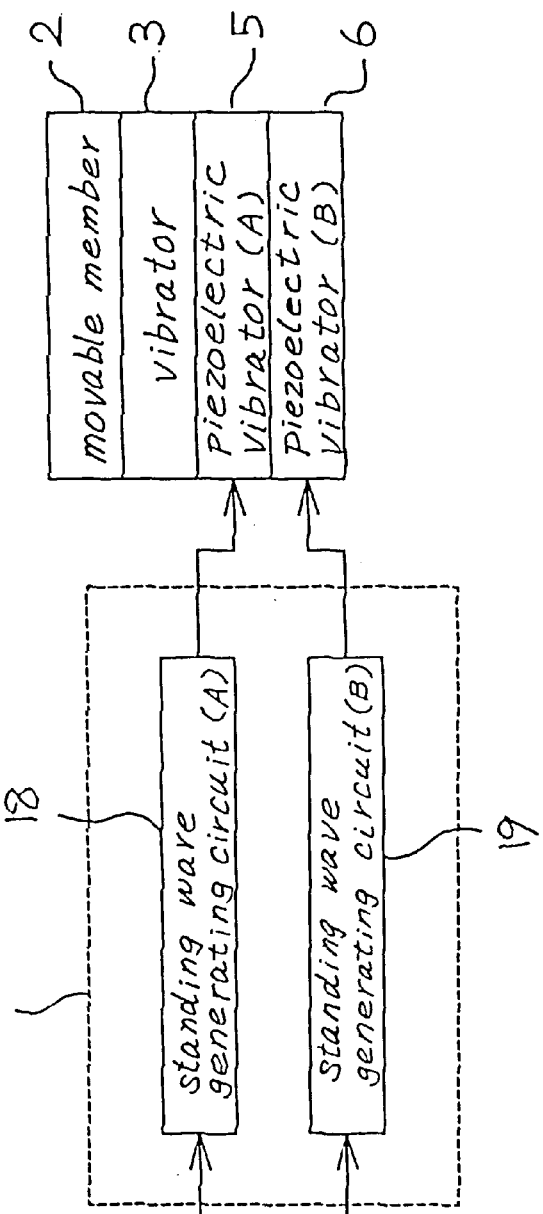
FIG. 8 is a functional block diagram of the second embodiment of the present invention.

FIG. 8 is a functional block diagram of the second embodiment of the present invention. An ultrasonic vibration generating circuit 11 having a circuit for generating the first type of standing wave (A) 18 and a circuit for generating the second type of standing wave (B) 19 is switched by a switching circuit 14 composed of a timing circuit 15, timing storing circuit 16 and a selection circuit 17, and either the piezoelectric vibrator (A) 5 or the piezoelectric vibrator (B) 6 is driven. Then, the vibration is magnified by the vibrating member 3 and the movable member is step-driven.

Figure 9:
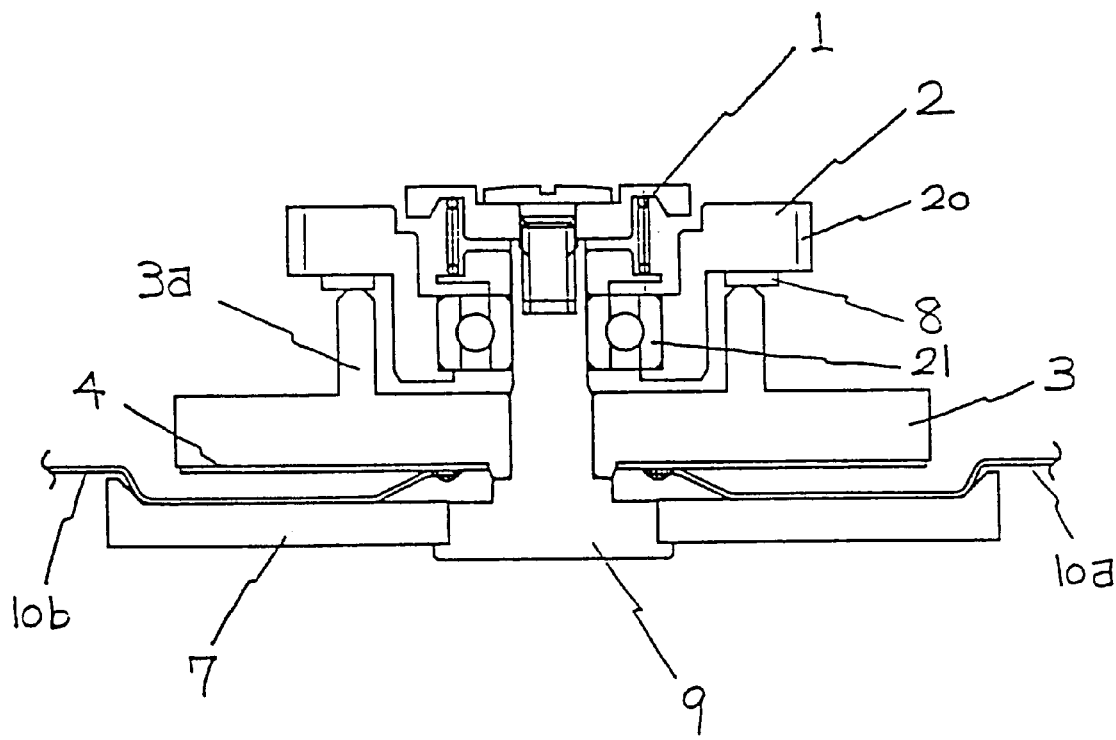
FIG. 9 is a sectional view showing the third embodiment of the present invention.

FIG. 9 is a sectional view of the third embodiment of the present invention. A movable member 2 is provided with a gear member 20 as an output driving member. As to pressurization means, the present invention does not employ the way of pressurizing the upper face of the center of a movable member 2 with a flat spring. An outer ring of a bearing 21 is fixed to the movable member 2, and also the upper face of an inner ring of the bearing 21 is urged by a pressure spring 1 while the inner ring of the bearing 21 is rotationally guided by a center shaft. What this embodiment is most different from the above first and second embodiments is that step-drive is realized with only one piece of piezoelectric vibrator 4. Further, the movable member can be driven both in the first mode which does not include nodal portions and in the second mode which includes nodal portions in a radial direction.

FIG. 10 is a movement explanatory chart of the third embodiment. One piece of piezoelectric vibrator 4 having electrode patterns 4a, 4b which are divided into a plurarity and bonded to a vibrating member 3 by means such as adhesion. "+" and "−" used in the figure indicate directions of polarization of respective electrode pattern portions. As shown in the figure, in this embodiment, the electrode patterns of 4a and 4b are polarization-processed in twos in the same direction in such a sequential order "+, +, −, −. . . ". Lead lines (A) and (B), 10a and 10b respectively connect 4a and 4b alternately. In this embodiment, the electrode constitution is that one wavelength consists of four electrode patterns. In this state, a high frequency voltage signal of the same phase is applied to the lead lines (A) 10a and (B) 10b (i.e. electrode pattern 4a and 4b). Then, the vibrating member 3 is excited with a standing wave having nodal portions b1, b2 and b3 as shown in FIG. 10(b). Consequently, concentrated load portions a1, a2 and a3 of the movable member 2 having slits 2a shown in FIG. 10(a) respectively halt at the portions which respectively agree with b1, b2 and b3.

Figure 10A:
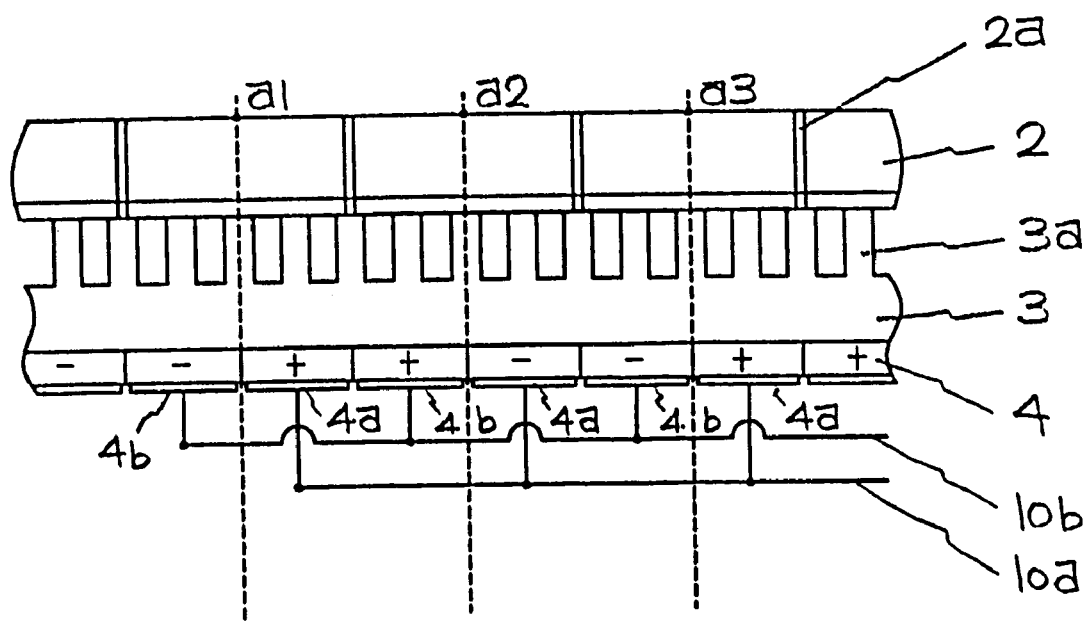
FIG. 10 is a movement explanatory chart of the third embodiment of the present invention.
Figure 10B:
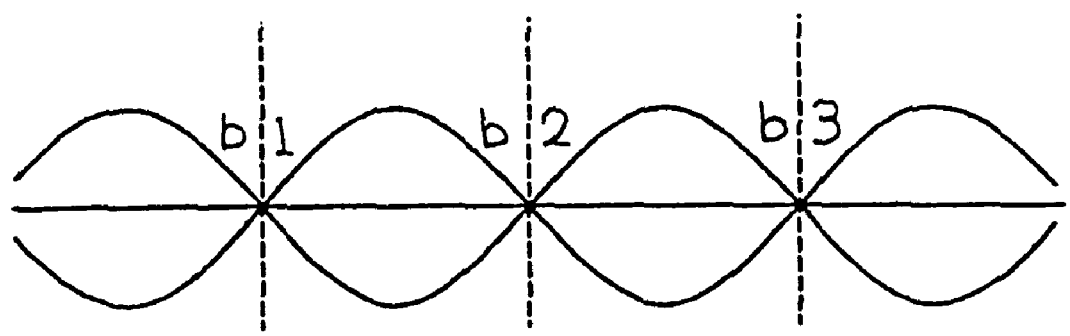
Figure 10C:
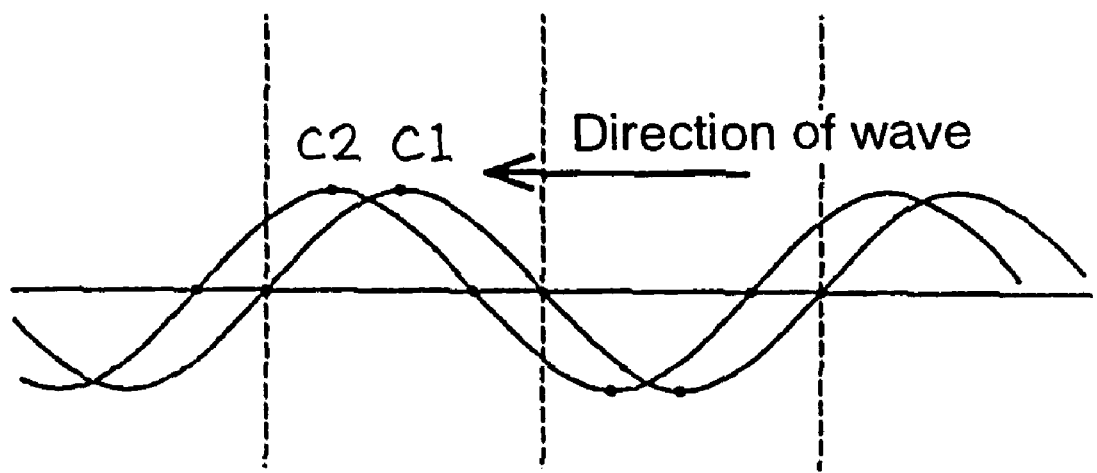
Figure 10D:
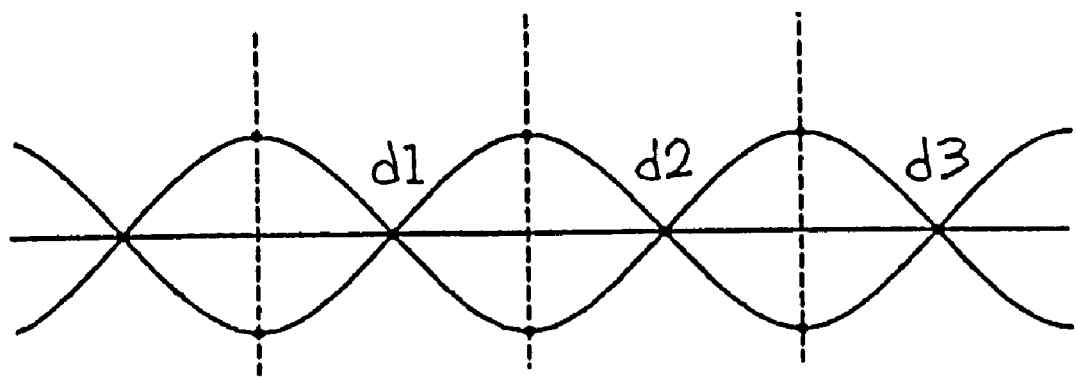
Figure 10E:
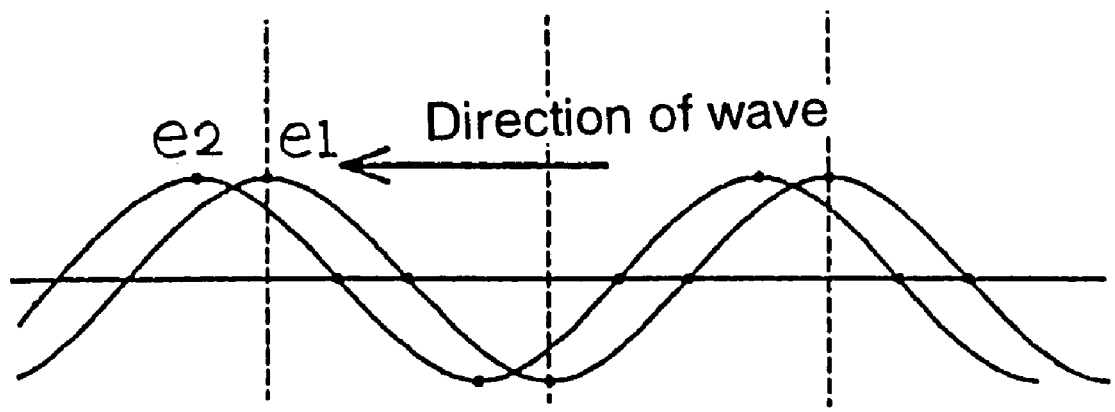

Next, the lead line (A) 10a and the lead line (B) 10b, (i.e. the electrode patterns 4a and 4b) are applied respectively with one of the two high frequency voltage signals, which are different by 90° in phase. Then, the vibrating member 3 is excited with such a travelling wave as a point of the wave travels from c1 to c2 as shown in FIG. 10(c). Consequently, the movable member 2 having the slits 2a shown in FIG. 10(a) travels in the direction opposite to the wave. The repetition of the above movements enables the movable member 2 to step-drive in every other slit 2a provided on the movable member 2. However, this embodiment is much different from the above first and second embodiments in the following respect. That is, if the lead line (A) 10a and the lead line (B) 10b, i.e., the electrode patterns 4a and 4b are applied respectively with one of the two high frequency voltage signals, which are antiphases (i.e. are different by 180° in phase), the movable member 3 is excited with such a standing wave having d1, d2 and d3 as nodal portions as shown in FIG. 10(d). Consequently, the concentrated load portions a1, a2 and a3 of the movable member 2 having the slits 2a shown in FIG. 10(a) respectively halt at the positions which respectively agree with d1, d2 and d3. Further, if the lead line (A) 10a and the lead line (B) 10b, i.e., the electrode patterns 4a and 4b are again applied respectively with one of the two high frequency voltage signals, which are different by 90° in phase, the vibrating member 3 is excited with a travelling wave a point of which travels from e1 to e2 as shown in FIG. 10(e). Consequently, the movable member 2 having the slits 2a shown in FIG. 10(a) travels in the direction opposite to the wave. The repetition of the above movements enables the movable member 3 to step-drive in every one half of the slit 2a provided on the movable member 2. Therefore, it is possible to control a minute step-angle with a small number of slits even if a diameter of the movable member is reduced. In this embodiment, one wavelength is composed of four split electrode patterns. However, further minute step-angle can be controlled if one wavelength is composed of a smaller even number of split electrode patterns.

Figure 11:
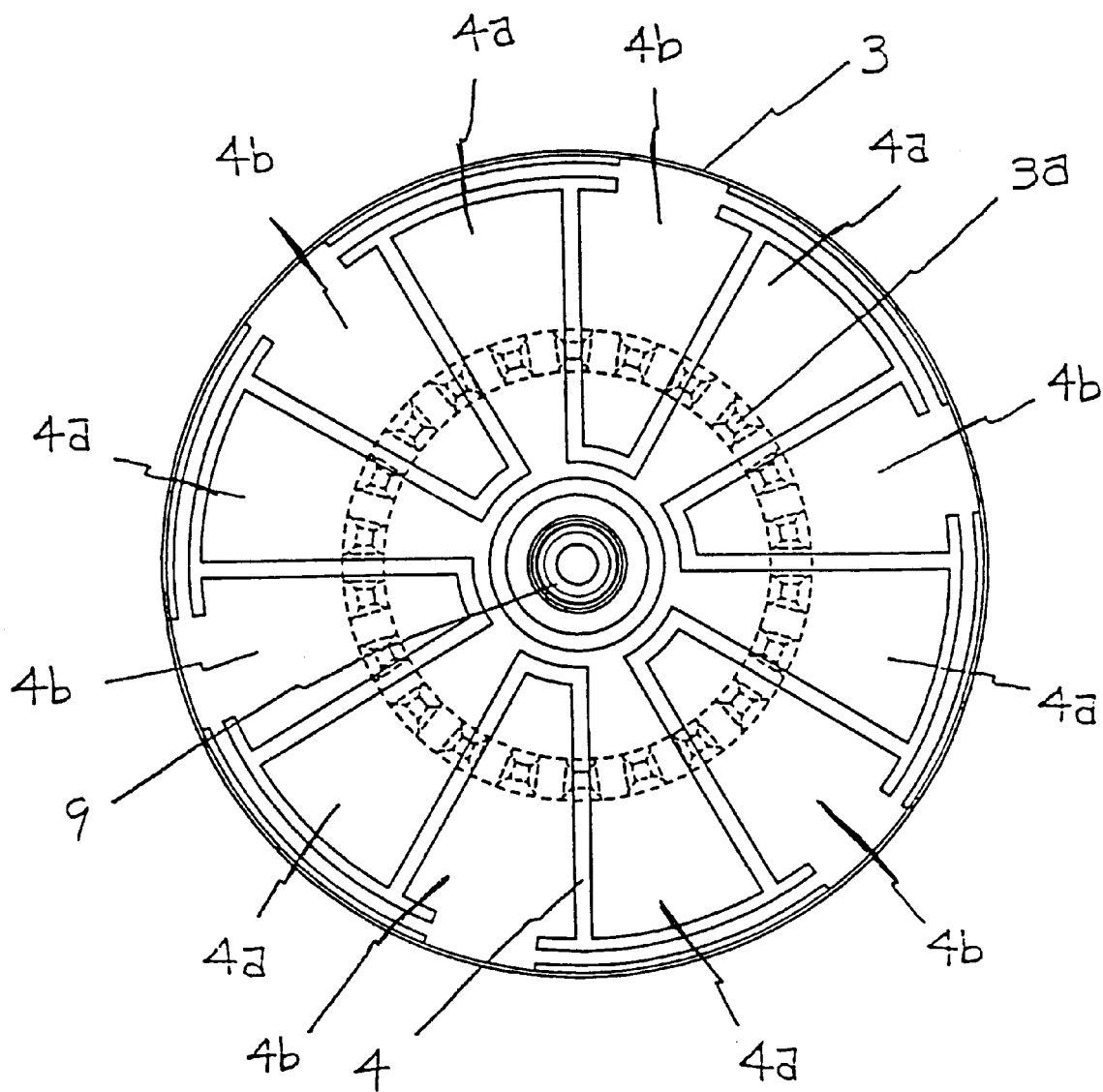
FIG. 11 is a plane view showing an electrode pattern of a piezoelectric vibrator of the third embodiment of the present invention.

FIG. 11 is a plane view showing an electrode pattern of a piezoelectric vibrator in the third embodiment of the present invention. In this embodiment, one wavelength is composed of four split electrode patterns and three waves can be excited in the direction of the circumference, so that the piezoelectric vibrator has twelve split electrode patterns. Therefore, it is fundamentally necessary to connect twelve lead lines to the motor. However, there is a drawback in that vibration is restrained and the performance declines if many lead lines are connected to such a small ultrasonic motor as the present invention discloses. In this embodiment, the piezoelectric vibrator 4 is polarization-processed in a sequential order, +, +, −, −. A short-circuiting electrode pattern is formed by connecting the inner periphery and the outer periphery of the piezoelectric vibrator alternately in order to connect only with two lead lines.

Figure 12:
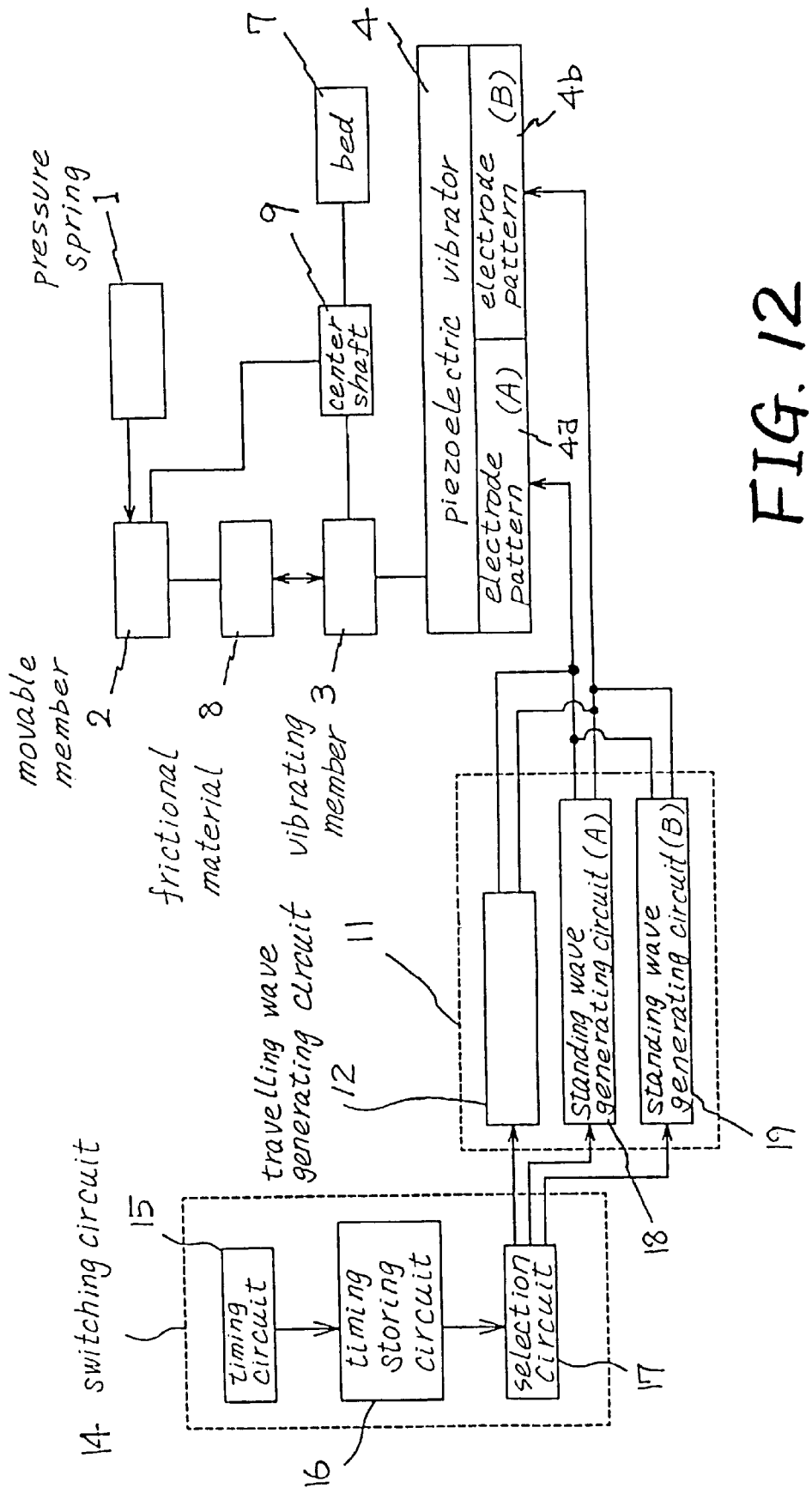
FIG. 12 is a functional block diagram of the third embodiment of the present invention.

FIG. 12 is a functional block diagram in the third embodiment of the present invention. An ultrasonic vibration generating circuit 11 including a travelling wave generating circuit 12, a first type of standing wave generating circuit (A) 18, and a second type of standing wave generating circuit (B) 19 is switched by a switching circuit 14 which is composed of a timing circuit 15, a timing storing circuit 16 and a selection circuit 17. Either of the electrode pattern (A) 4a and the electrode pattern (B) 4b is selecting driven. Then, the vibration is magnified by the vibrating member 3 and the movable member 2 is step-driven.

Figure 13:
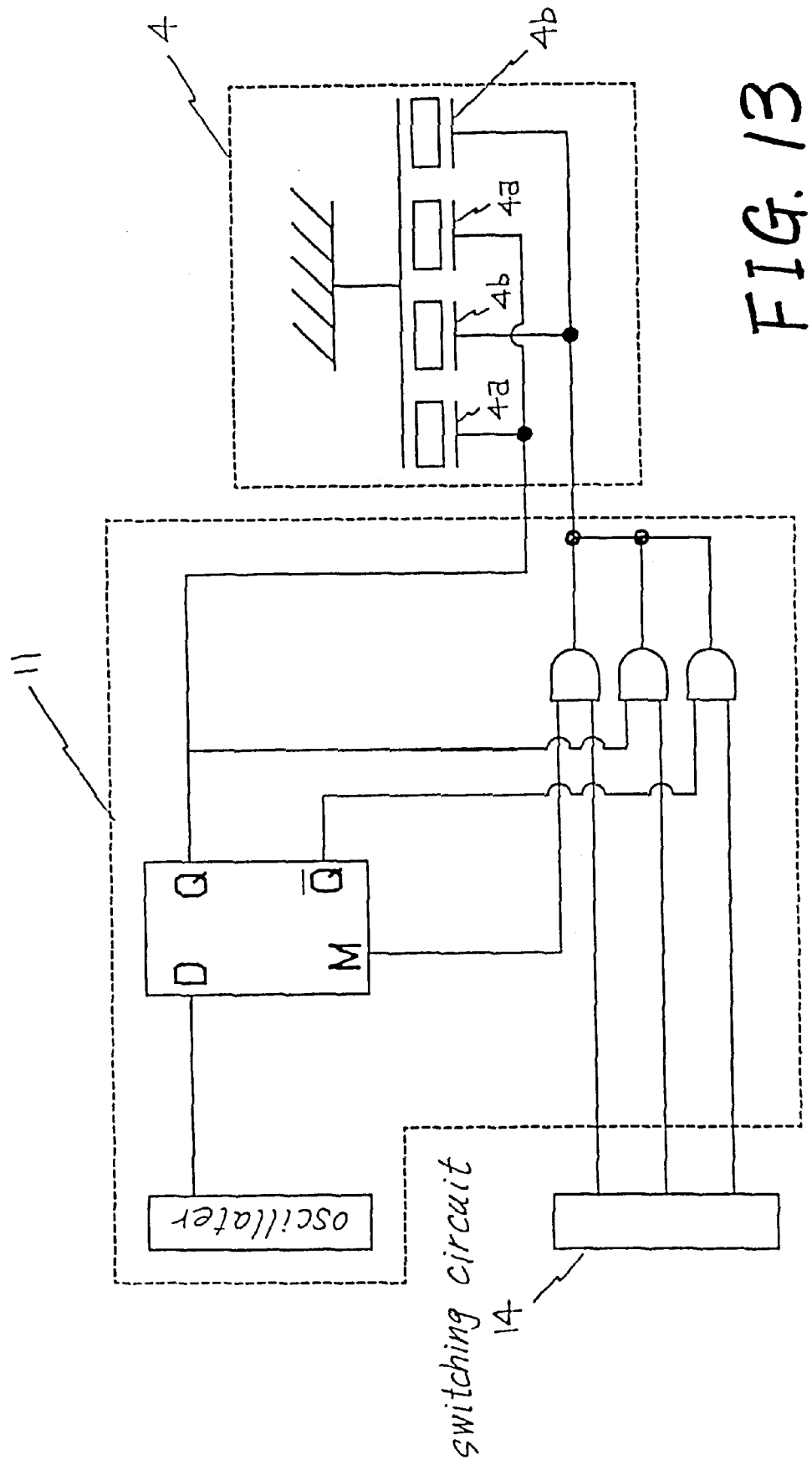
FIG. 13 is a circuit diagram showing an ultrasonic vibration generating circuit of the third embodiment of the present invention.

FIG. 13 is a circuit diagram showing the ultrasonic vibration generating circuit in the third embodiment of the present invention. When the travelling wave is selected, the travelling wave generating circuit 12 uses the output from the switching circuit 14 for applying a Q output on the electrode pattern 4a and applying, on the electrode pattern 4b, an M output which is different from the Q output by 90° in phase. When the first type of standing wave is selected, the first type of standing wave generating circuit (A) 18 uses the output from the switching circuit 14 for applying the Q output of the same phase on the electrode patterns 4a and 4b. Further, when the second type of standing wave is selected, the second type of standing wave generating circuit (B) 19 uses the output from the selection circuit 17 for applying the Q output on the electrode pattern 4a and applying, on the electrode pattern 4b, a $\overline{Q}$ output which is different from the Q output by 180° in phase.

FIGS. 14–20 show the embodiments which realize the present invention by changing a standing wave for drive and a standing wave for halt.

Figure 14A:
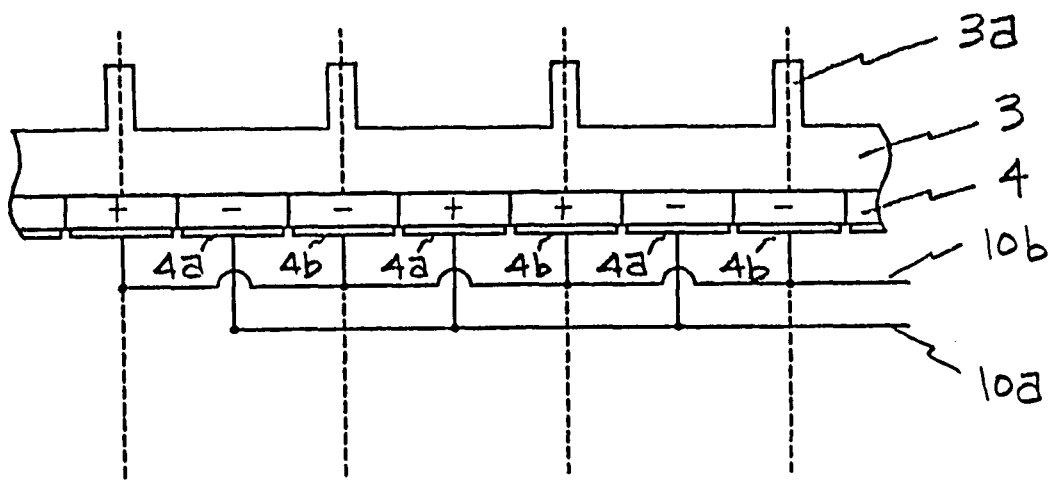
FIG. 14(a), FIG. 14(b) and FIG. 14(c) are respectively a sectional view and movement explanatory charts of the fourth embodiment of the present invention.
Figure 14B:
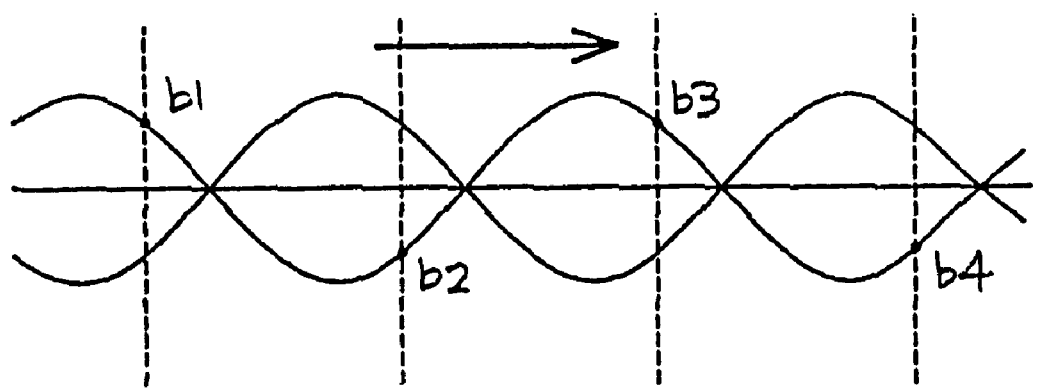
Figure 14C:
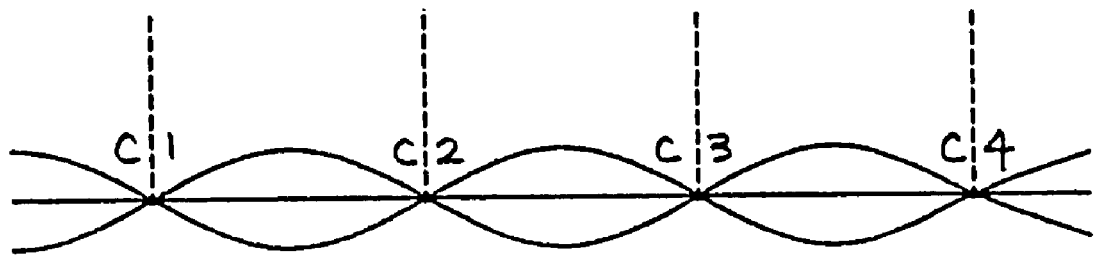

FIG. 14(a) and FIGS. 14(b) and (c) are respectively a sectional view and movement explanatory charts of the fourth embodiment of the present invention. As shown, in FIG. 14(a), electrode patterns of 4a and 4b are polarization-processed two by two in such a sequential order as +, +, −, −. A lead line (A) 10a and a lead line (B) 10b respectively connect 4a and 4b alternately. Further, the present invention has an electrode structure such that one wavelength is composed of four electrode patterns. If, in this state, the lead line (A) 10a and the lead line (B) 10b (i.e., are applied with a high frequency signal of the same phase, a vibrating member 3 is excited with a standing wave shown in FIG. 14(b). Consequently, drive force is acted on a movable member 2 at b1, b2 and b3 by projections 3a. Next, when the application of the signal to the lead line (B) 10b is stopped and a high frequency signal is applied only to the lead line (A) 10a, the vibrating member 3 is excited with such a standing wave having c1, c2 and c3 as nodal portions as shown in FIG. 14(c). Then, concentrated lead portions of the movable member having ununiform portions halt at the respective nodal portion. The repetition of the above steps enables the movable member to step-drive. Additionally, the movable member can be traveled in the opposite direction, if there is 180° of difference between the phases of the high frequency voltage signals which are respectively applied to the lead line (A) 10a (the electrode pattern 4a) and the lead line (B) 10b (the electrode pattern 4b) at the time of driving.

Figure 15A:
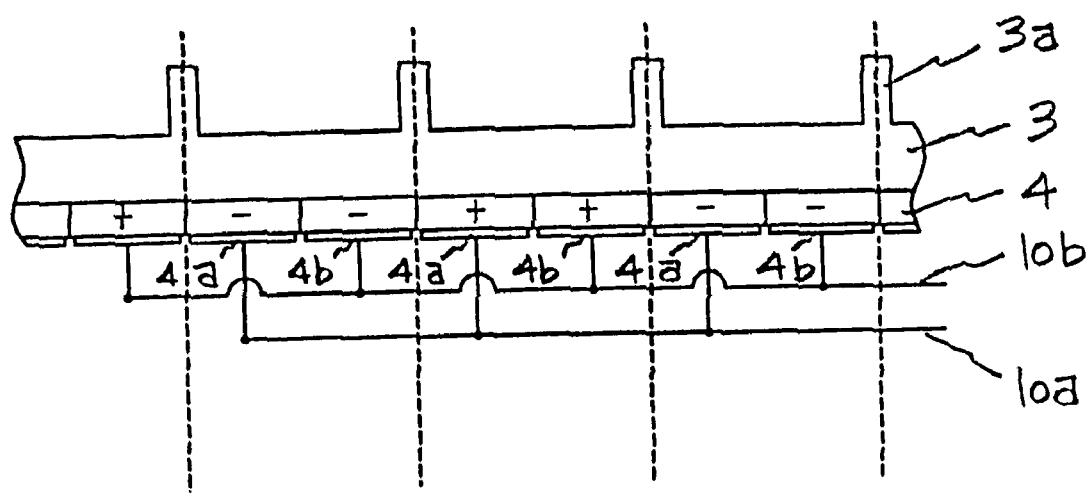
FIG. 15(a), and FIGS. 15(b) and (c) are respectively a sectional view and movement explanatory charts of the fifth embodiment of the present invention.
Figure 15B:
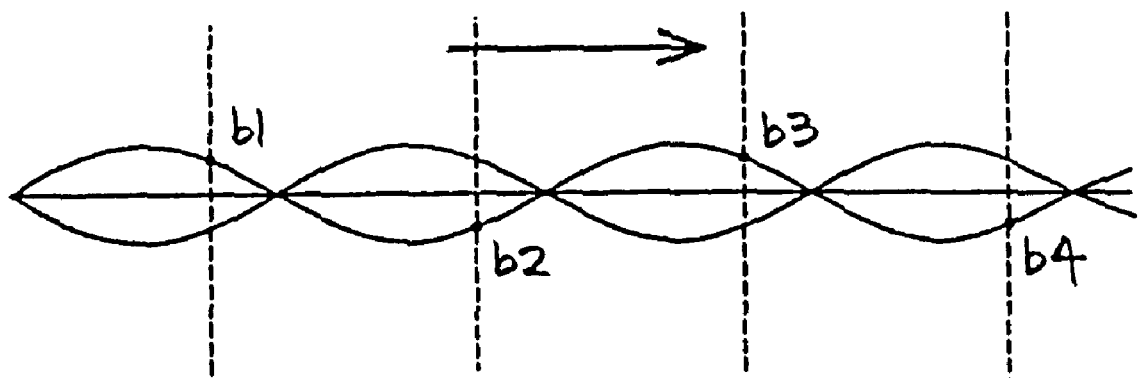
Figure 15C:
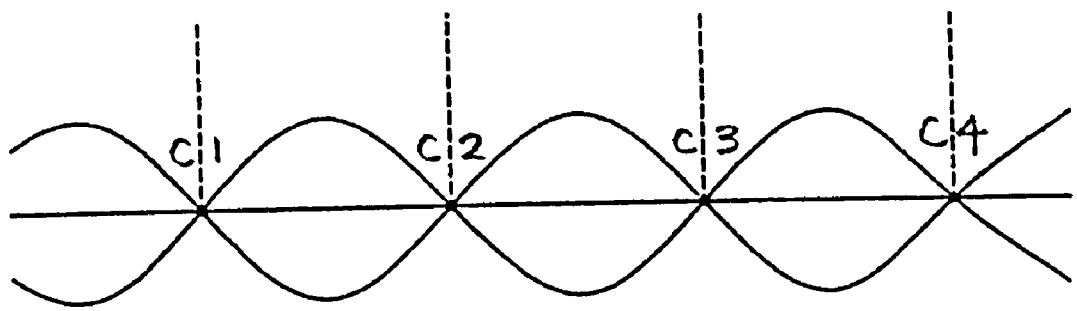

FIG. 15(a) and FIGS. 15(b) and (c) are respectively a sectional view and movement explanatory charts showing the fifth embodiment of the present invention. Basically, this embodiment is the same as the above fourth embodiment, but different only in the following respect. For driving, the application of a high frequency voltage signal to a lead line (A) 10a is stopped and a high frequency voltage signal is applied only to a lead line (B) 10b. On the other hand, for halting, a high frequency voltage signal of the same phase is applied to both the lead line (A) 10a and the lead line (B) 10b (i.e. electrode patterns 4a and 4b). In this embodiment, the high frequency voltage signal is applied only to the lead line (A) 10a for driving, it is possible to step-drive the movable member 2 in an opposite direction.

Figure 16A:
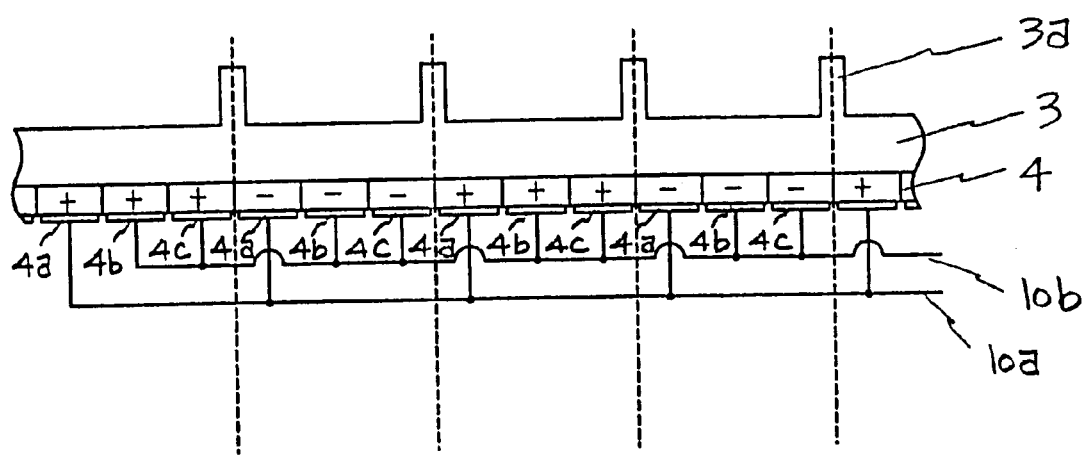
FIG. 16(a), and FIGS. 16(b) and (c) are respectively a sectional view and movement explanatory charts of the sixth embodiment of the present invention.
Figure 16B:
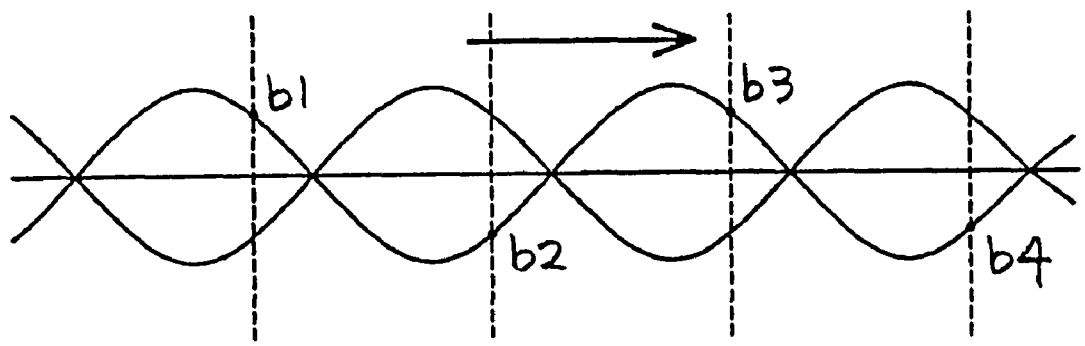
Figure 16C:
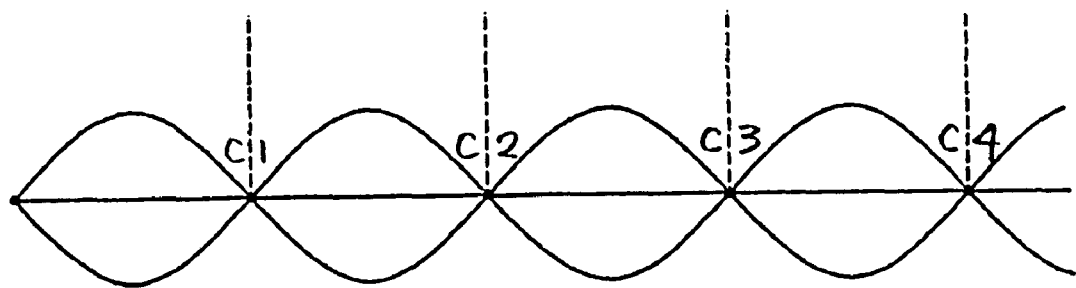

FIG. 16(a), and FIG. 16(b) and (c) are respectively a sectional view and movement explanatory charts showing the sixth embodiment of the present invention. In this embodiment, as shown in FIG. 16(a), the electrode patterns are polarization-processed sequentially in threes in the same direction in such a manner "+, +, +, −, −, −". The electrode patterns 4a, and 4b and 4c are respectively connected by the lead line (A) 10a and the lead line (B) 10b as shown in the figure. Further, in this embodiment, the electrode has such a construction as one wavelength is composed of six electrode patterns. In this state, if a high frequency voltage signal of the same phase is applied to the lead line (A) 10a and the lead line (B) 10b (i.e. the electrode patterns 4a, and 4b and 4c), a vibrating member 3 is excited with a standing wave as shown in FIG. 16(b) and a drive force is acted to a movable member at b1, b2 and b3 by the projections 3a. Then, if the lead line (A) 10a and the lead (B) 10b (i.e. the electrode pattern 4a and 4b) are applied respectively with one of the two high frequency voltage signals which have 180° of difference in phase, the vibrating member 3 is excited with such a standing wave having c1, c2 and c3 as nodal portions as shown in FIG. 16(c). Then, concentrated load portions of the movable member having ununiform portions halt the respective nodal portions. The repetition of the above movements enables the movable member to step-drive.

Figure 17A:
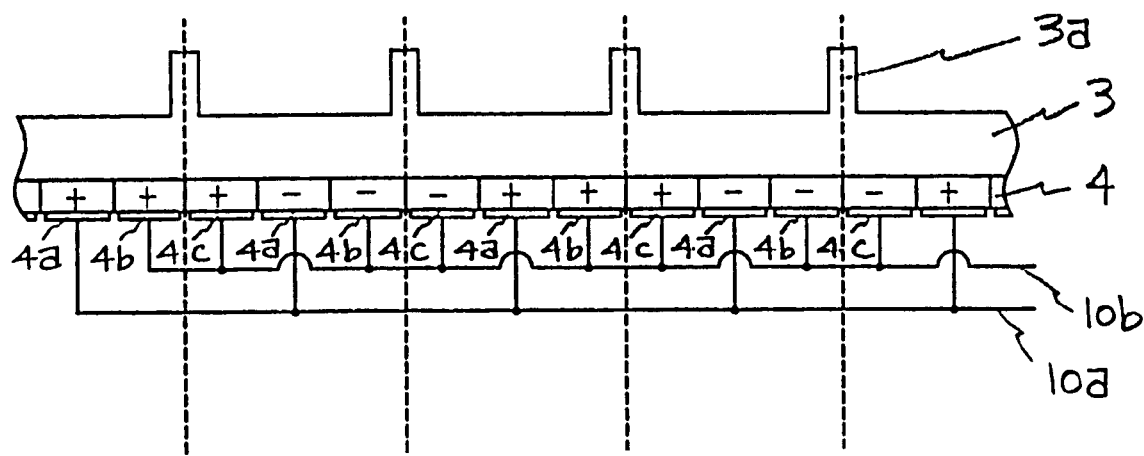
FIG. 17(a), and FIGS. 17(b), (c), (d) and (e) are a respectively sectional view and movement explanatory charts of the seventh embodiment of the present invention.
Figure 17B:
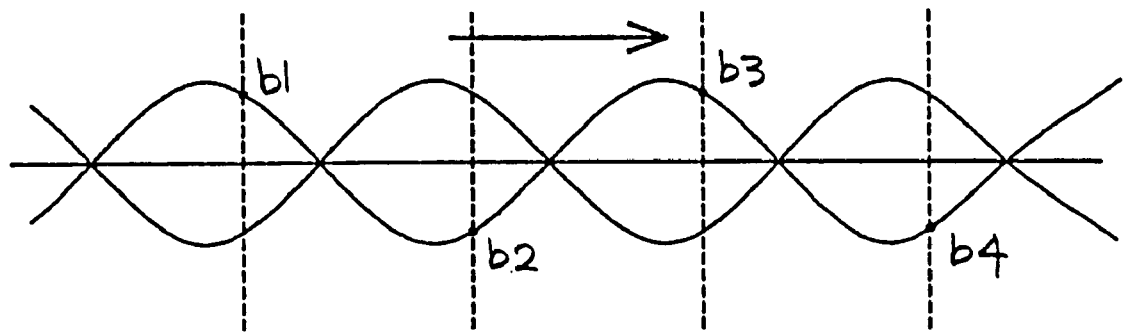
Figure 17C:
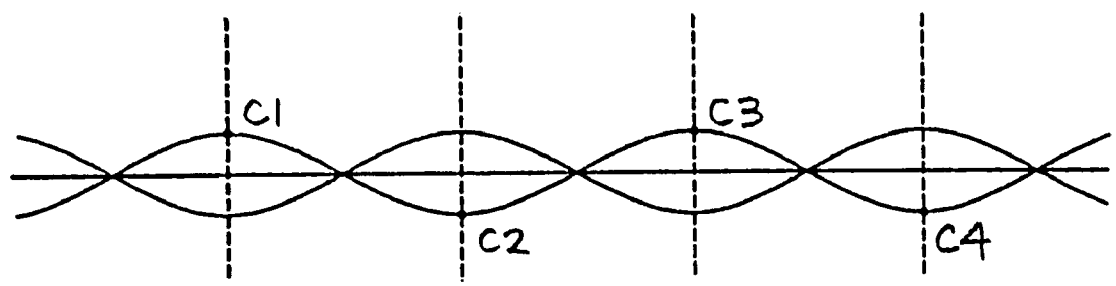
Figure 17D:
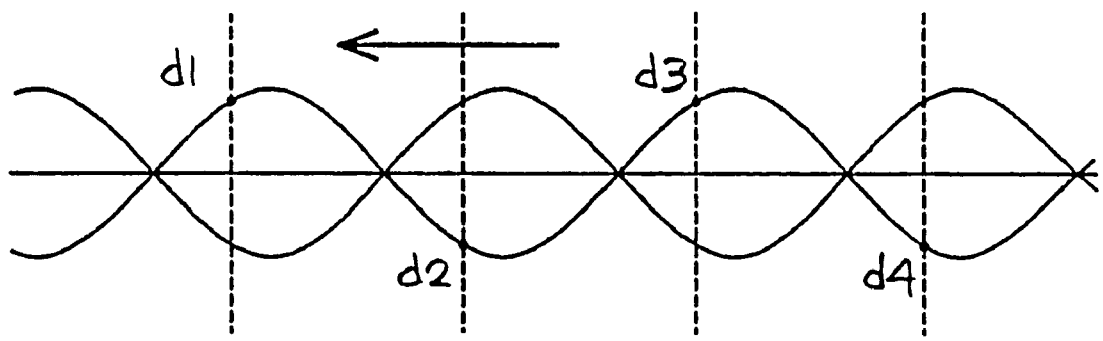
Figure 17E:
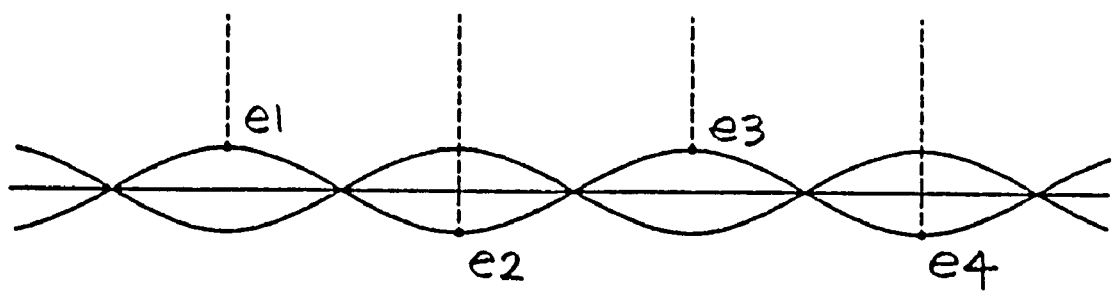

FIG. 17(a) and FIGS. 17(b), (c) and (d) are respectively a sectional view and movement explanatory charts showing the seventh embodiment of the present invention. In this embodiment, as shown in FIG. 17(a), electrode patterns 4a, 4b, 4c are polarization-processed sequentially in threes in the same direction in such a manner "+, +, +, −, −, −". The electrode patterns 4a, and 4b and 4c are respectively connected by a lead line (A) 10a and a lead line (B) 10b as shown in the figure. Further, in this embodiment, the electrode has such a construction as one wavelength is composed of six electrode patterns, with each two adjacent electrode patterns being separated by a boundary. In this state, if a high frequency voltage signal of the same phase is applied to the lead line (A) 10a and the lead line (B) 10b (i.e. the electrode patterns 4a, and 4b and 4c), a vibrating member 3 is excited with a standing wave shown in FIG. 17(b) and a drive force acts on a movable member at b1, b2 and b3 by the projections 3a. At this point, the projections 3a are disposed at every other one of the intermediate positions between a maximum amplitude portion and a nodal portion of the standing wave. Then, the application of the signal to the lead line (A) 10a is stopped and a high frequency voltage signal is applied only to the lead line (B) 10b, the vibrating member 3 is excited with a standing wave having c1, c2 and c3 as antinodal portions as shown in FIG.

17(c). That is, the projections 3a are disposed at maximum portions of the standing wave. Further, each of the projections 3a is located at a boundary between two adjacent electrode patterns 4a–4c. Then, concentrated load portions of the movable member having ununiform portions halts on the respective nodal portions. The repetition of the above movements enables the movable member to step-drive. Further, the movable member can be driven in the opposite direction, if the lead line (A) 10a and the lead line (B) 10b (i.e. the electrode patterns 4a, and 4b and 4c) are applied respectively with one of the two high frequency voltage signal which are different by 180° in phase.

Figure 18A:
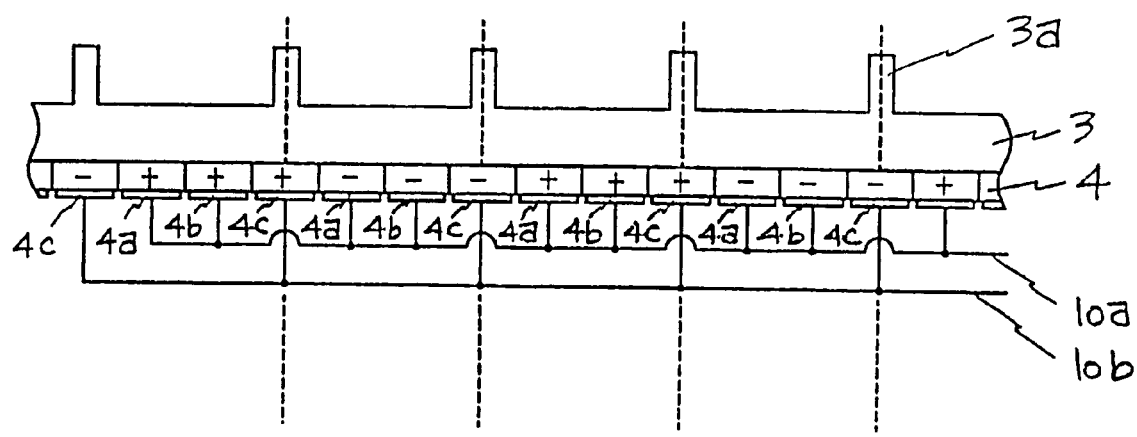
FIG. 18(a), and FIGS. 18(b), (c), (d) and (e) are respectively a sectional view and movement explanatory charts of the eighth embodiment of the present invention.
Figure 18B:
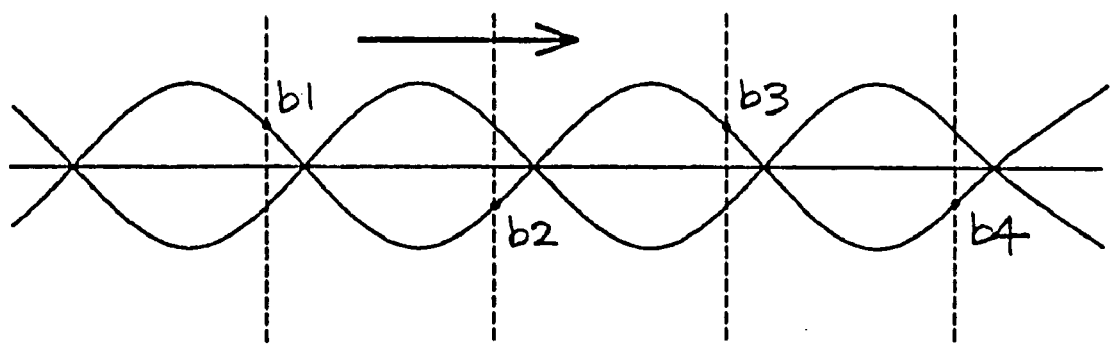
Figure 18C:
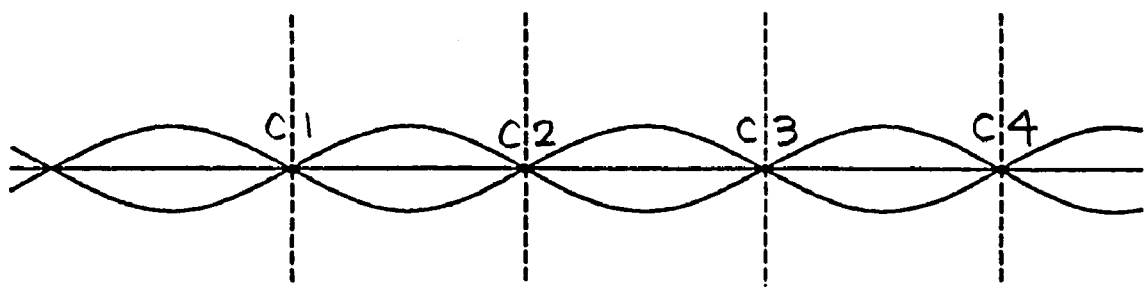
Figure 18D:
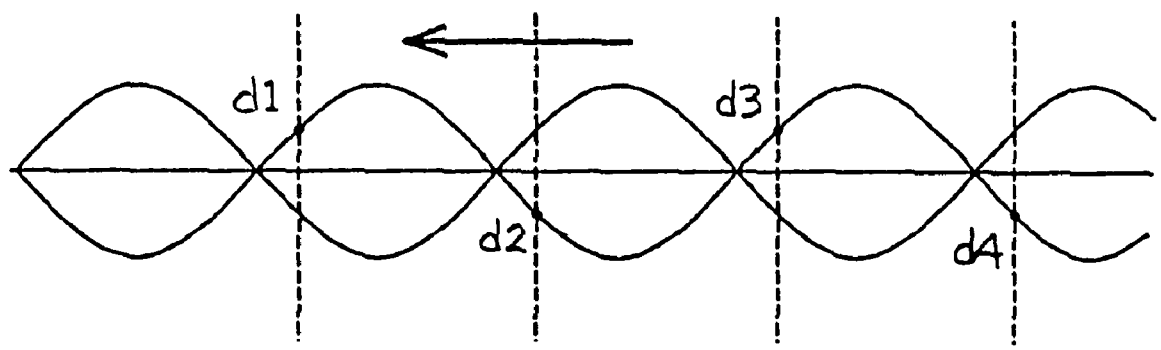
Figure 18E:
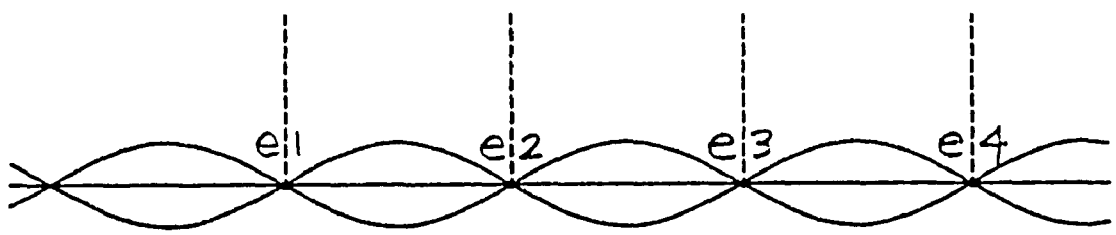

FIG. 18(a) and FIGS. 18(b), (c), (d) and (e) are respectively a sectional view and movement explanatory charts showing the eighth embodiment of the present invention. Though this embodiment is basically the same as the above seventh embodiment, it is quite different in respect of the way of connecting to respective electrode patterns, and the relative position between protruding portions 3a and electrode patterns 4a, 4b and 4c.

Figure 19A:
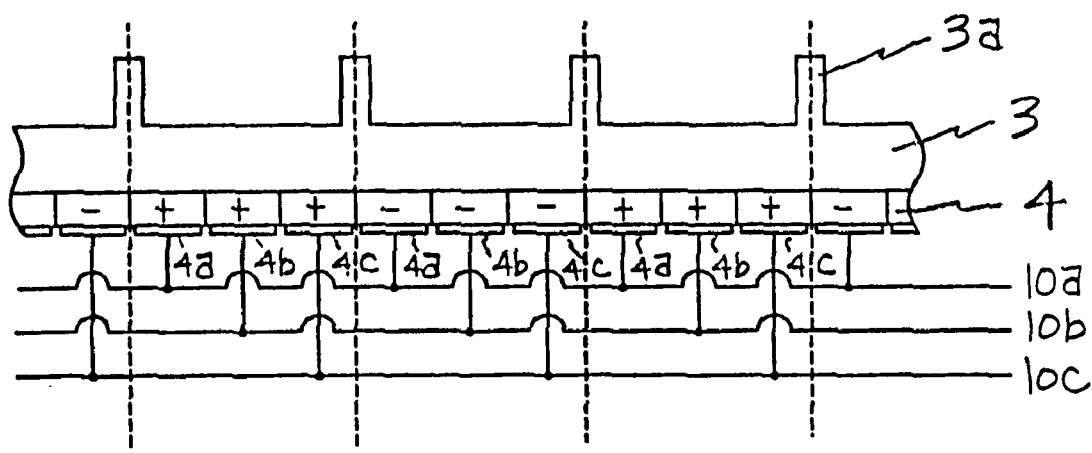
FIG. 19(a), and FIGS. 19(b), (c), (d) and (e) are respectively a sectional view and movement explanatory charts of the ninth embodiment of the present invention.
Figure 19B:
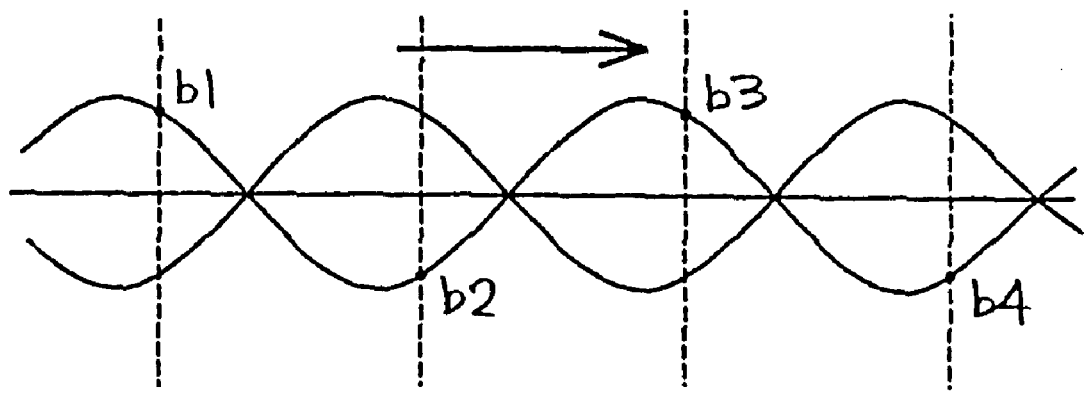
Figure 19C:
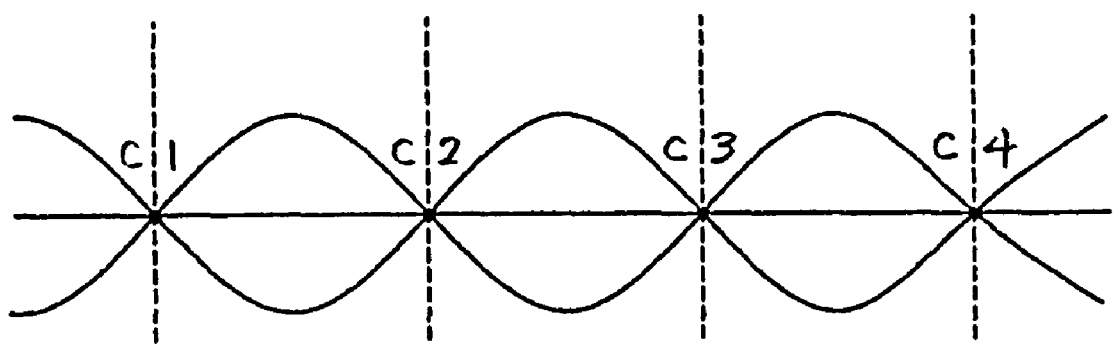
Figure 19D:
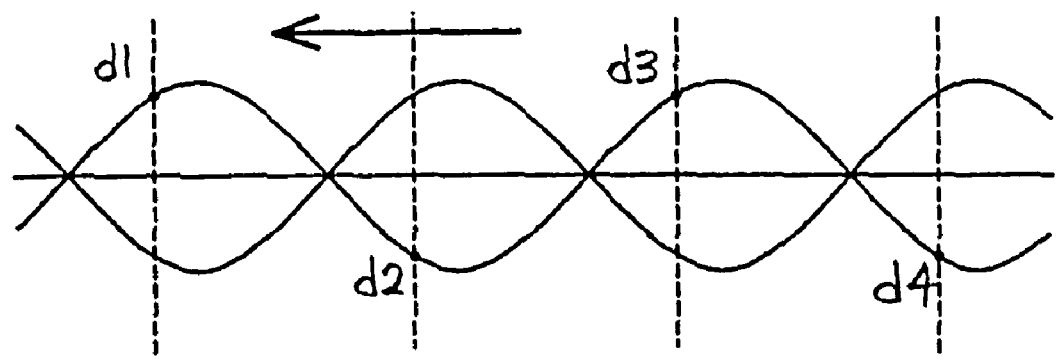
Figure 19E:
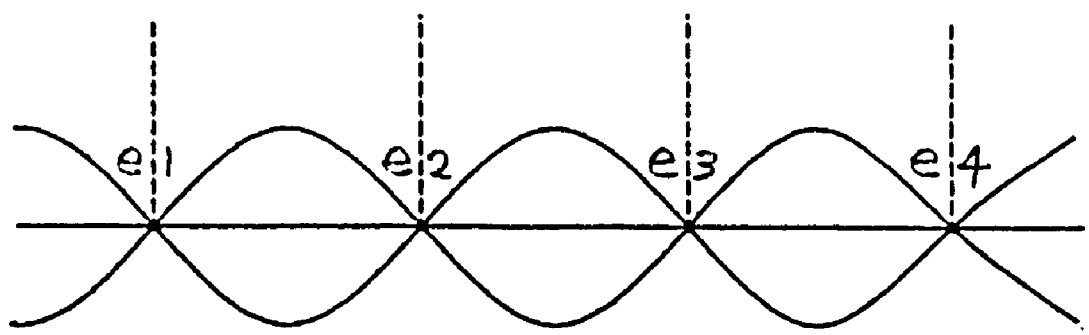

FIG. 19(a) and FIGS. 19(b), (c), (d) and (e) are respectively a sectional view and movement explanatory charts showing the ninth embodiment of the present invention. In this embodiment, as shown in FIG. 19(a), electrode patterns 4a, and 4b and 4c are polarization-processed sequentially in threes in the same direction in such a manner "+, +, +, −, −, −". The electrode patterns 4a, and 4b and 4c are respectively connected by a lead line (A) 10a, a lead line (B) 10b, and a lead line (C) 10c as shown in the figure. Further, in this embodiment, the electrode has such a constitution as one wavelength is composed of six electrode patterns. If, in this state, the lead line (A) 10a, and the lead lines (B) 10b and (C) 10c (i.e. the electrode patterns 4a, and 4b and 4c) are respectively applied with one of the two high frequency voltage signals which have 180° of difference in phase, a vibrating member 3 is excited with a standing wave shown in FIG. 19(b). Then, a drive force is acted on a movable member at b1, b2 and b3 by the projections 3a. Next, if a high frequency voltage signal of the same phase is applied on the lead lines (A) 10a, and the lead lines (B) 10b and (C) 10c, (i.e. the electrode patterns 4a, and 4b and 4c), the vibrating member 3 is excited with a standing wave having c1, c2 and c3 as nodal portions as shown in FIG. 19(c). Then concentrated load portions having ununiform portions halt at the respective nodal portions. The repetition of the above movements enables the movable member to step-drive. Further, as shown in FIGS. 19(d) and (e), if the phases of high frequency voltage signals which are applied respectively to the lead lines (A) 10a and (B) 10b, and the lead line (C) 10c are different by 180°, it is possible to drive the movable member in the opposite direction.

Figure 20:
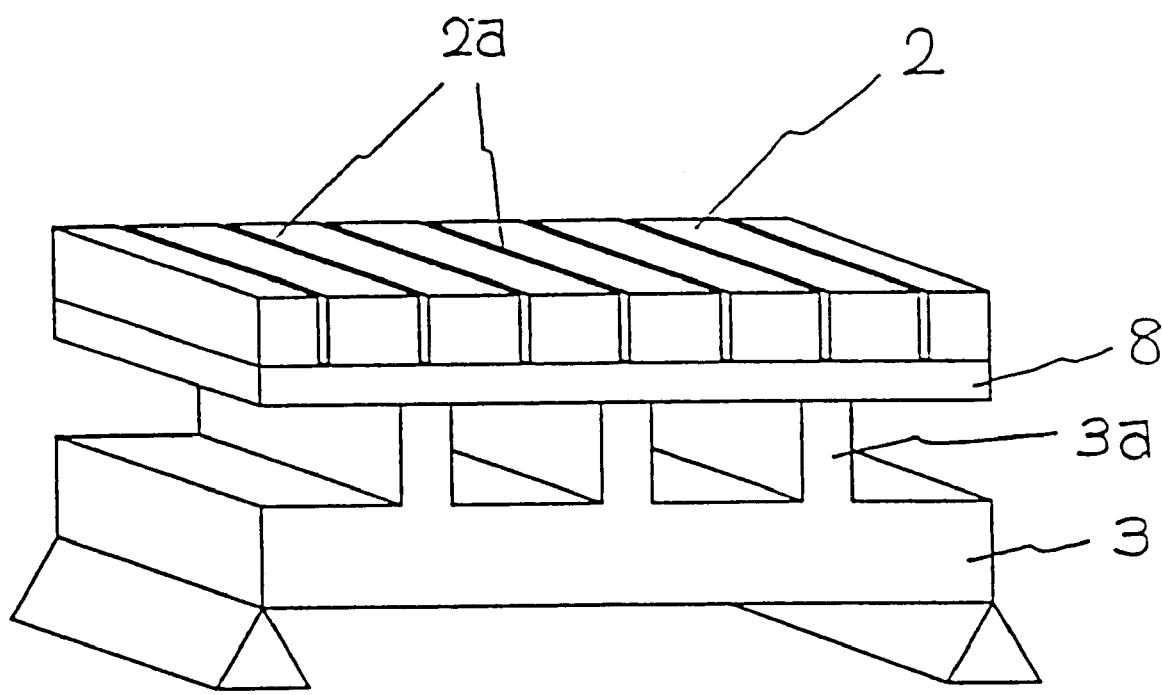
FIG. 20 is a perspective view of the tenth embodiment of the present invention.

FIG. 20 is a perspective view showing the tenth embodiment of the present invention. Though only a rotary ultrasonic motor is disclosed in the above-mentioned embodiments, it is also possible to step-drive a linear ultrasonic motor in the present invention. In FIG. 20, a movable member having slits 2a is in pressure contact with a rectangular vibrating member having projections 3a, and the movable member 2 is step driven so that roughly middle parts of respective concentrated load portions formed between the two slits would halt above nodal portions which are excited to the vibrating member 3 by the action of a piezoelectric vibrator 4. As it is impossible to form slits spreading over the entire cross section of the movable member 2, it is preferable to provide slits like grooves on the movable member 2, or to form, on a thin layer of friction material 8, the movable member 2 having slits 2a on the upper surface as shown in the figure.

FIGS. 21–27 are embodiments of movable members used in the present invention. There are some ways for embodying the movable members which have a plurarity of ununiform portions on the cross sections in the direction of circumference as explained below.

Figure 21:
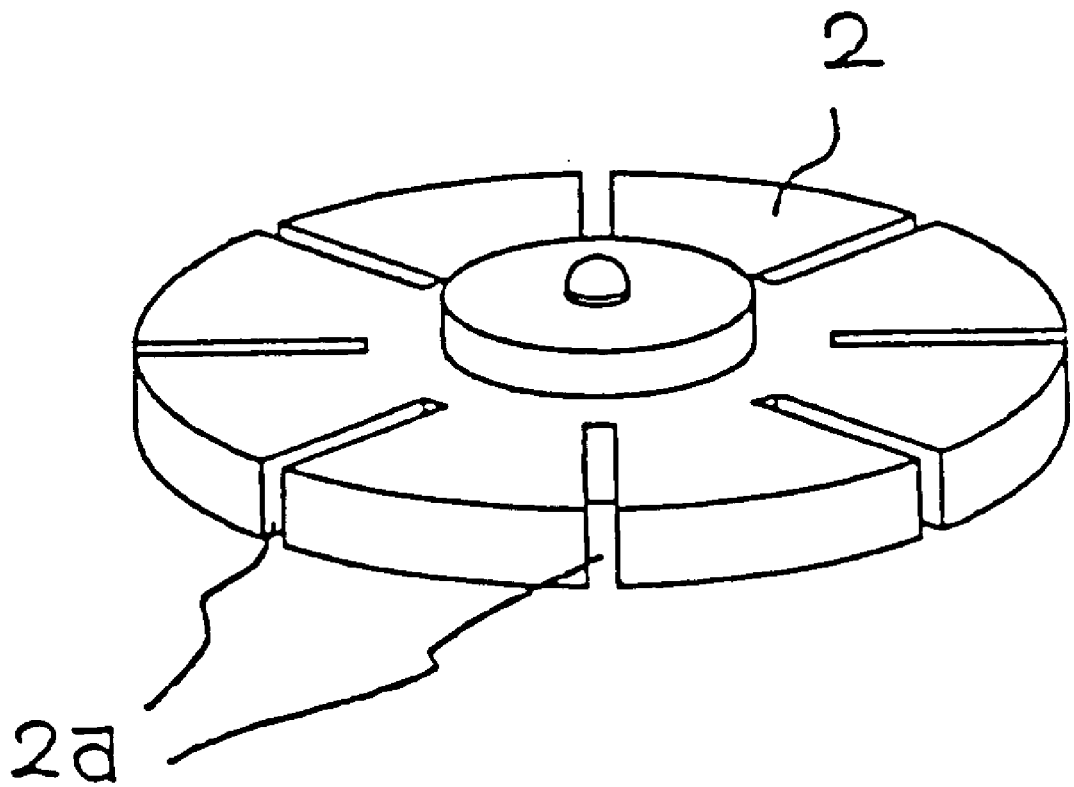
FIG. 21 is a perspective view of the first embodiment of a movable member used in the present invention.

FIG. 21 shows the embodiment in which concentrated load portions are formed by providing slits 2a on a movable member 2. The movable member is step-driven so that the middle of the two slits would be positioned by respective nodal portions of a standing wave which is excited on a vibrating member. At this moment, the number of the slits 2a is integral multiples of the number of crests composing the standing wave generated in the direction of circumference of the vibrating member. The narrower a width of the slit is, the more accurate the positioning at the time of driving becomes. However, the width and the length in a radial direction of the slits are selected depending on the shape of the portion where the movable member and the vibrating member contacts, necessary holding power, the condition for processing, and so on.

Figure 22:
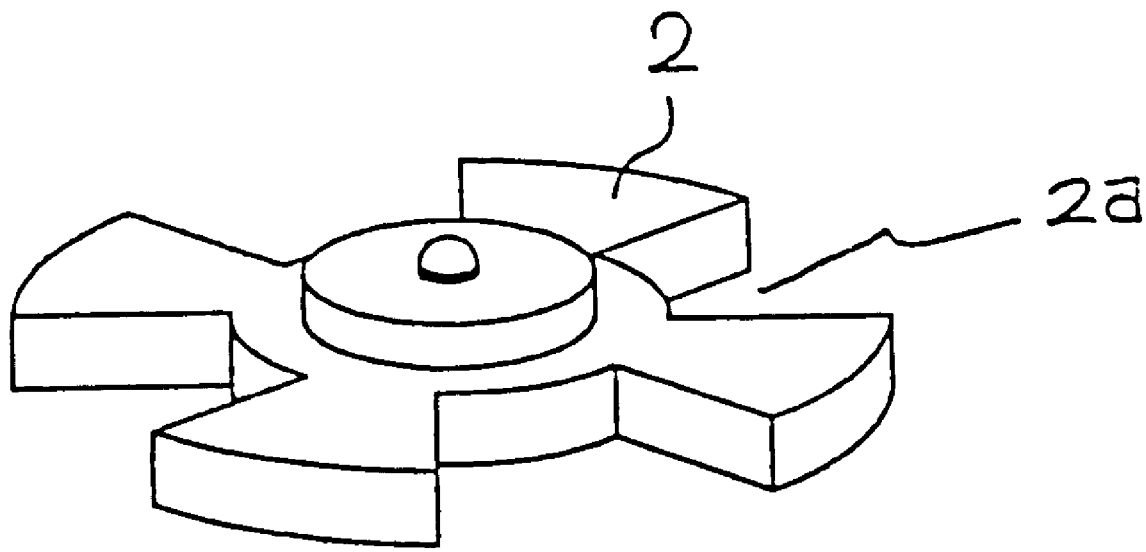
FIG. 22 is a perspective view the second embodiment of the movable member used in the present invention.

FIG. 22 shows the case that the width of the slits on the movable member shown in the embodiment of FIG. 21 is extremely widened. In this embodiment, a movable member is step-driven so that the middle of the fan-shaped portions of vane-type of the movable member would be positioned by nodal portions of a standing wave excited by a vibrating member.

Figure 23:
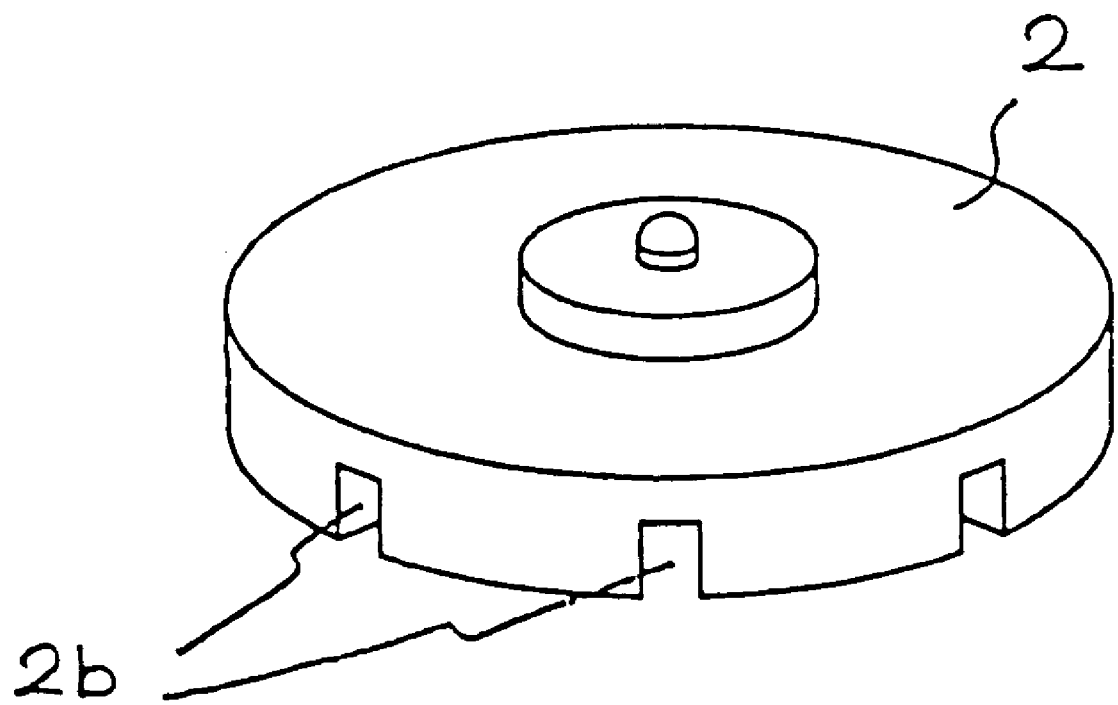
FIG. 23 is a perspective view of the third embodiment of the movable member used in the present invention.

In FIG. 23, concentrated load portions are formed by increasing the thickness of a movable member partially. As grooves 2b are provided on the movable member, there is formed concentrated load portions. The movable member is step-driven so that the middle position of each concentrated load portion (the middle between the two grooves shown in the figure) would be positioned by each of nodal portions of a standing wave excited to a vibrating member. At this moment, the number of grooves is integral multiples of the number of crests composing the standing wave generated in the direction of the circumference of the vibrating member.

Figure 24:
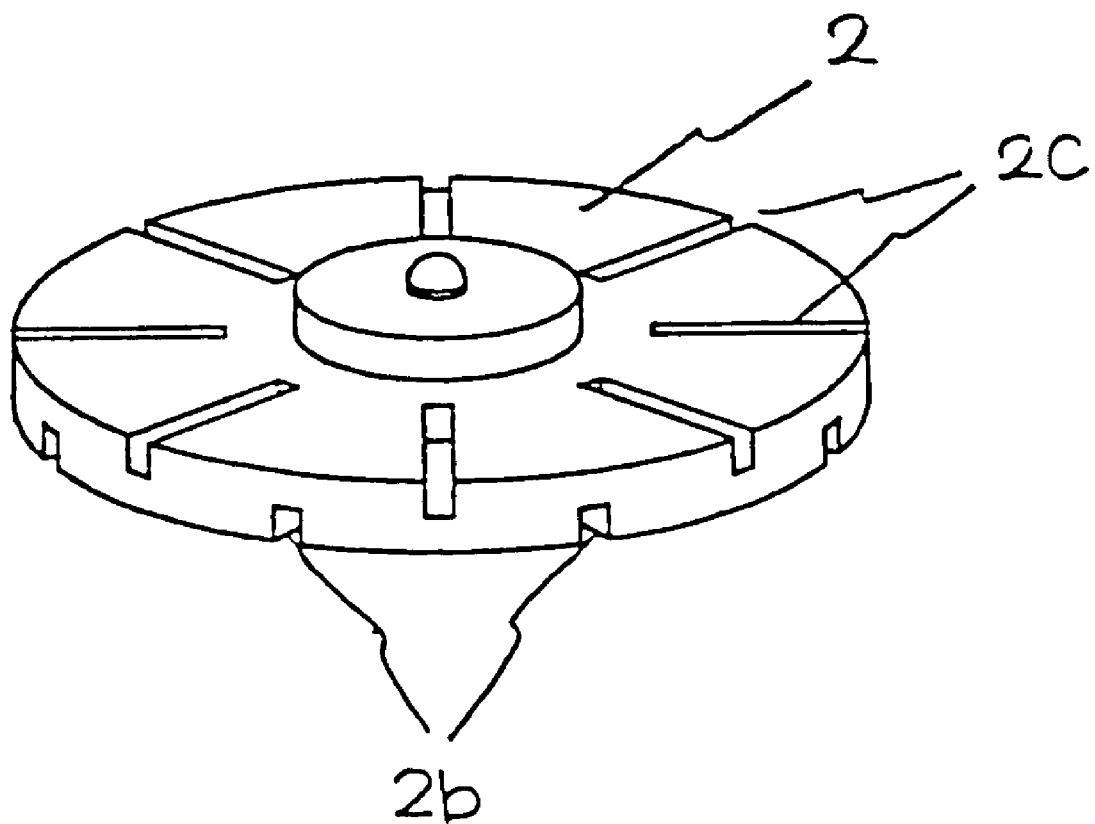
FIG. 24 is a perspective view of the fourth embodiment of the movable member used in the present invention.

In FIG. 24, concentrated load portions are formed by providing alternately grooves 2b on the bottom face and grooves 2c on the top face respectively of a movable member 2. The movable member is step-driven so that the middle between the groove 2b formed on the bottom face and the groove 2c formed on the top face would be positioned by each of nodal portions of a standing wave excited on a vibrating member. In such a structure, it is possible to form a number of concentrated load portions on the movable member and maintain the strength of the movable member, even if diameters of an ultrasonic motor and the movable member are reduced. Therefore, step-driving at a small angle can be realized.

Figure 25:
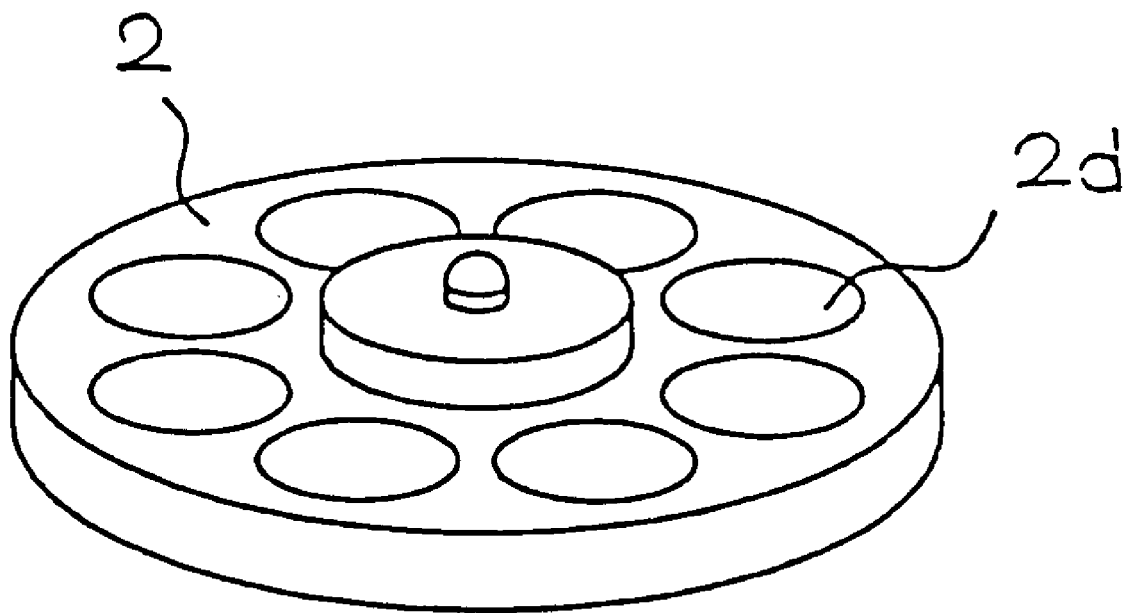
FIG. 25 is a perspective view of the fifth embodiment of the movable member used in the present invention.

FIG. 25 shows the embodiment in which concentrated load portions are formed by burying at equal intervals weights 2d the specific gravity of which is larger than that of a movable member. The movable member is step-driven so that a rough center of gravity of each weight 2d would be positioned by respective nodal portions of a standing wave excited on a vibrating member. At this moment, if gaps are provided on the movable member instead of the weights 2d of large specific gravity, on the contrary the middle portions of areas connecting respective gap become concentrated load portions. Therefore, the movable member is step-driven so that the middle portions are positioned by respective nodal portions of a standing wave excited on the vibrating member. The embodiments shown in FIGS. 21 to 25 show the cases the movable member having ununiform portions are composed of the same material. However, it is also possble to bond or coat the contact portion with the movable members with friction material which has a high coefficient of friction and is not subject to wear.

Figure 26:
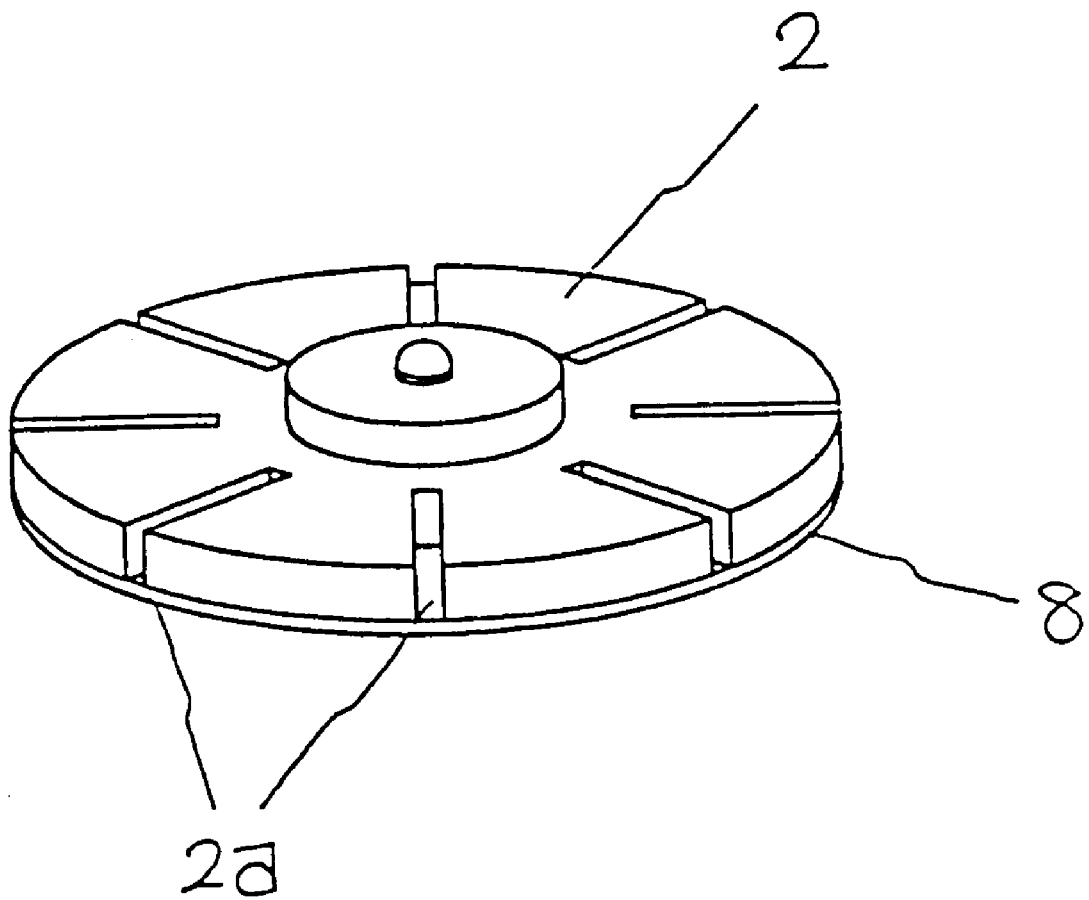
FIG. 26 is a perspective view of the sixth embodiment of the movable member used in the present invention.

In FIG. 26, a friction material 8 of a thin disc which has no slits and acts also as a slide board, is bonded on the movable member shown in the above FIG. 21 on which the concentrated load portions are formed by making the slits 2a. Though holding torque of this embodiment is a little weaker than that of the above embodiments, when a contact portion with a vibrating member is a comb tooth projection type, this embodiment resolves problems such as the contact point is caught by the slits of the movable member.

Figure 27:
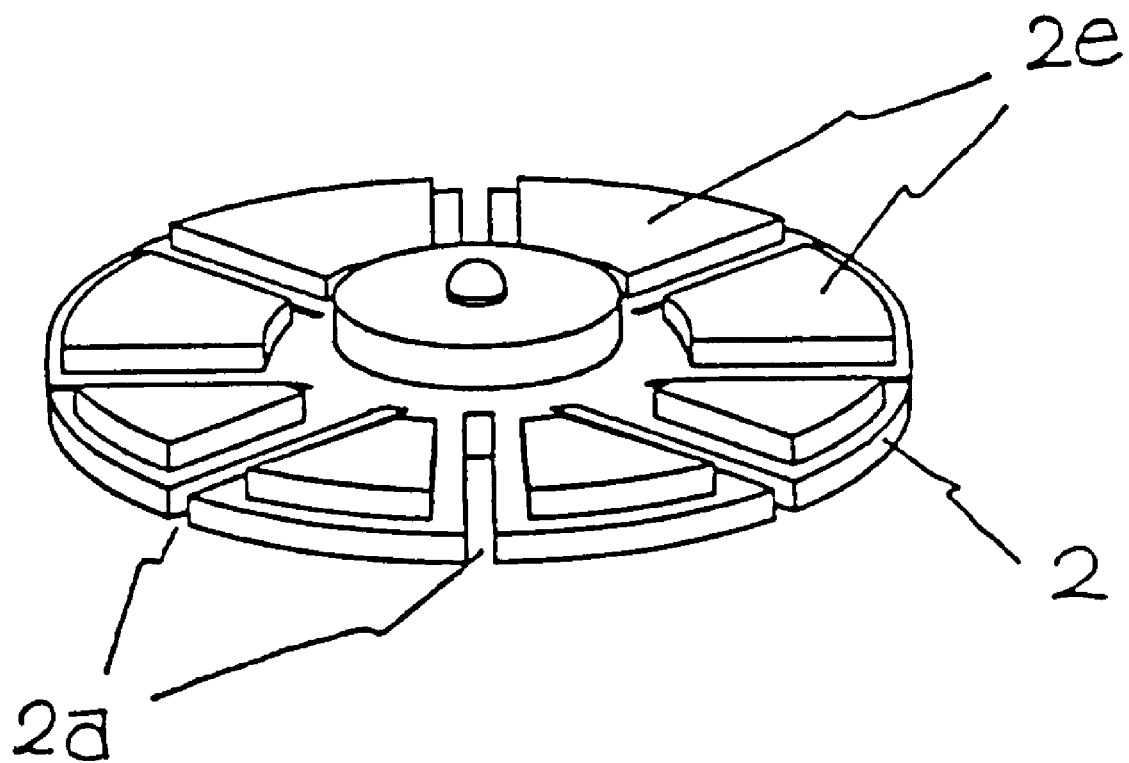
FIG. 27 is a perspective view of the seventh embodiment of the movable member used in the present invention.
Figure 28:
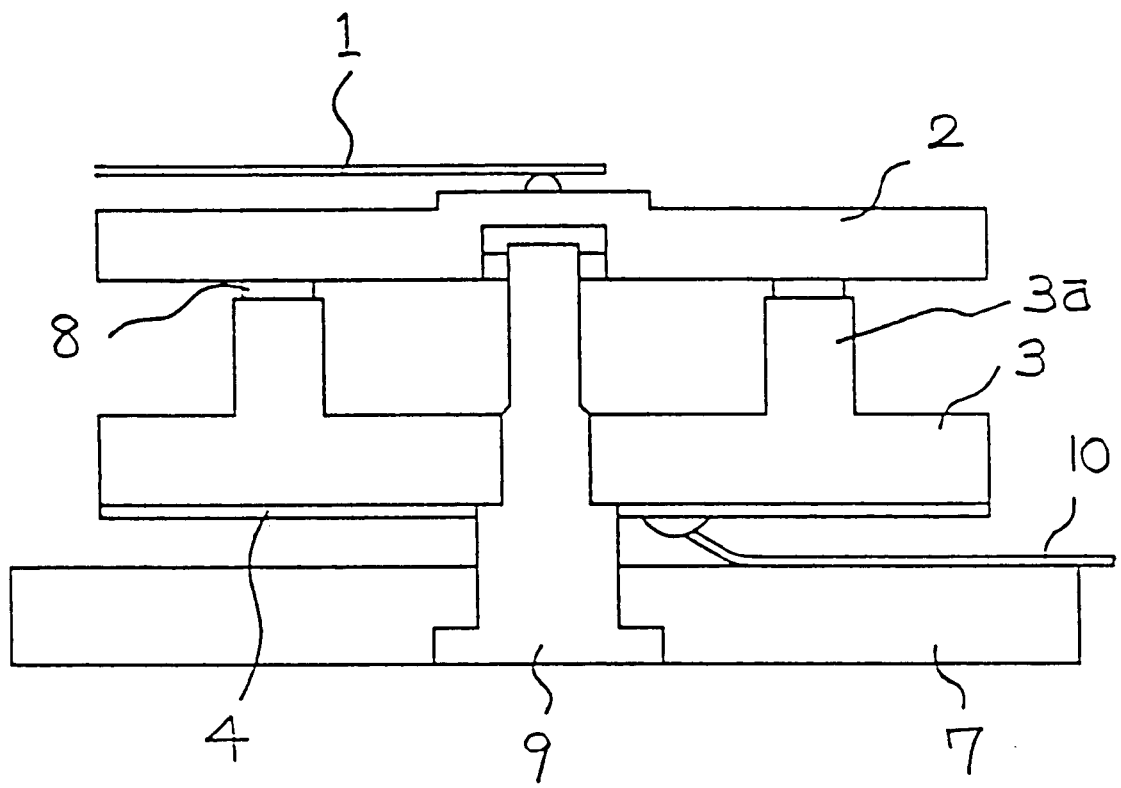
FIG. 28 is a sectional view showing a structure of a conventional ultrasonic motor.
Figure 29:
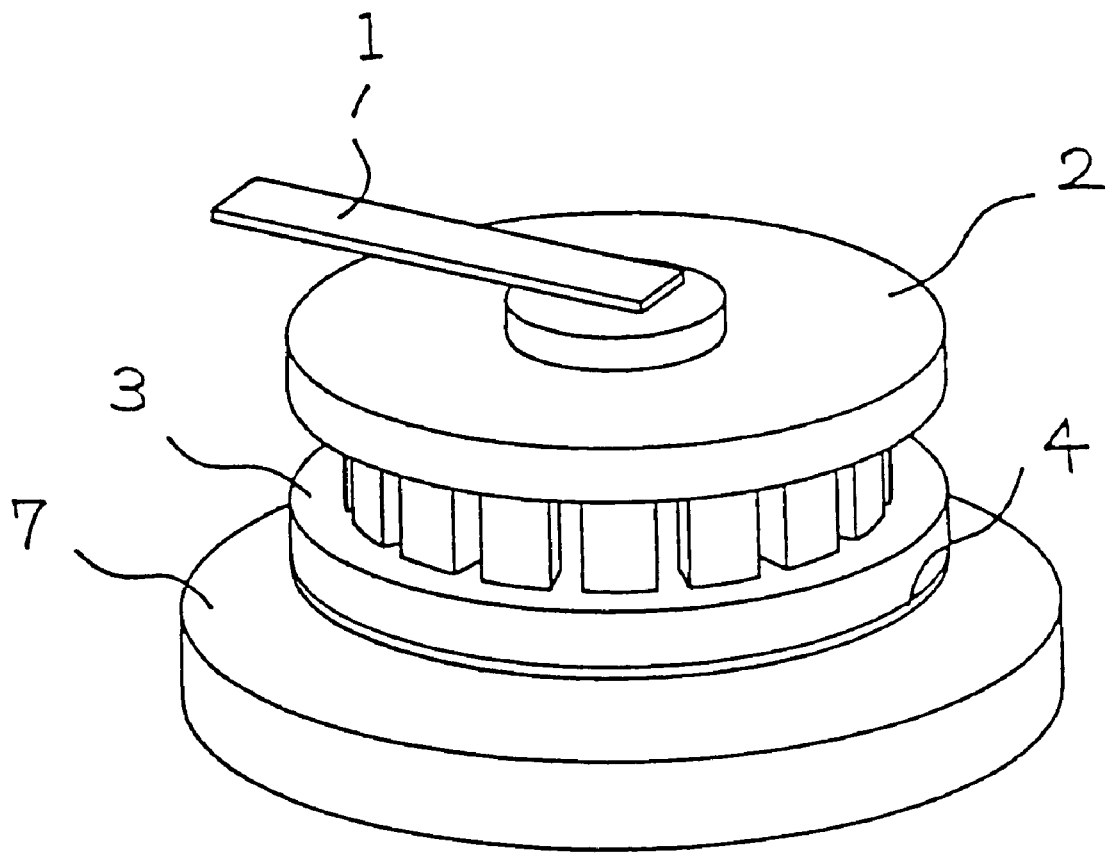
FIG. 29 is a perspective view of the conventional ultrasonic motor.
Figure 30:
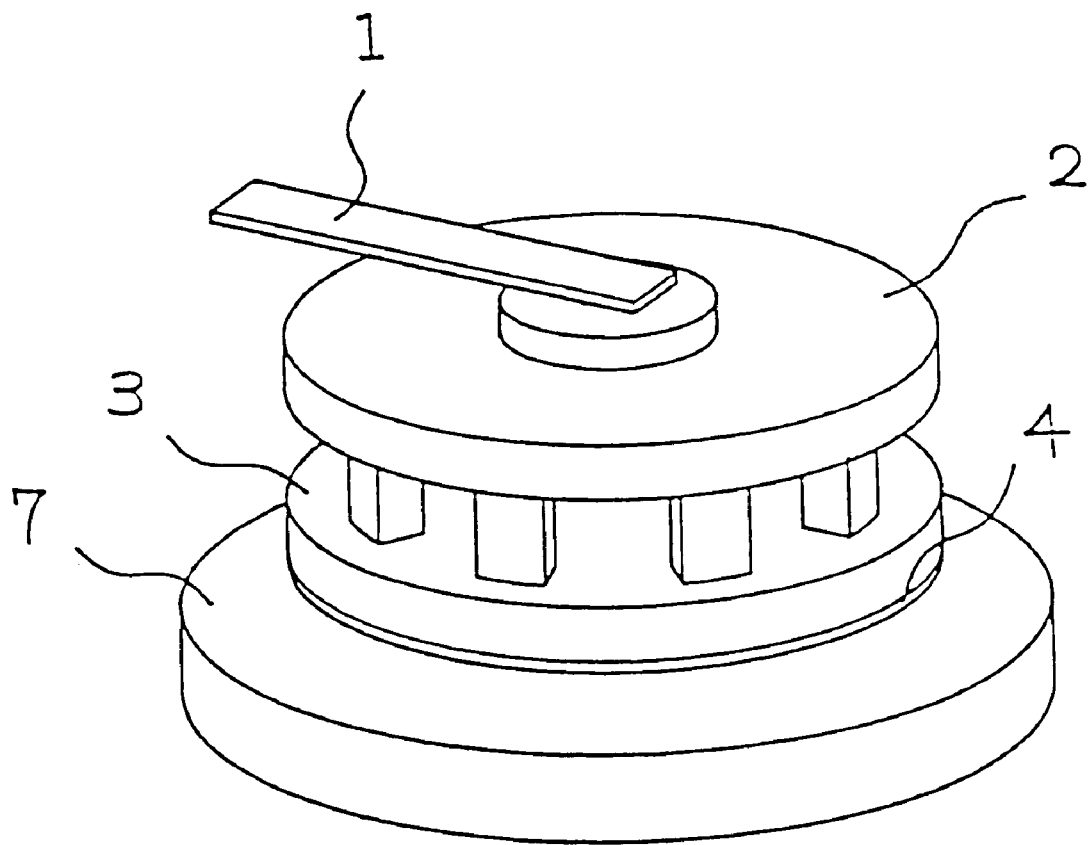
FIG. 30 is a perspective view of another conventional ultrasonic motor.

As mentioned, in FIG. 21, the concentrated load portions are formed by making slits 2a on the movable member 2. In FIG. 27, the above movable member 2 is added with weights 2e between the slits 2a, which is made of different material with larger specific gravity than the movable member such as tungsten in order to improve the holding power and ensure the step drive of the vibrating member. In this embodiment, it is preferable to form a portion having the slits with special sliding material in order to improve rotatory characteristics of a motor.

Further, in the embodiments shown in the FIGS. 21 to 27, the number of ununiform portions made on each movable member is integral multiples of the number of the nodal portions of the standing wave generated in the direction of a circumference of the vibrating member. For example, if a standing wave composed of three crests is generated in the direction of a circumference of the vibrating member, the number of ununiform portions of the movable member is integral multiples of three. Needless to say, the more the number of ununiform portions increases, the smaller that the step angle can be made. Further, if the number of the ununiform portions is the same as that of the nodal portions of the standing wave generated in the direction of the circumference of the vibrating member, the standing wave excited on the vibrating member can be propagated to the movable member. Therefore, it is also possible that the concentrated load portions of the movable member correspond with the respective antinodal portions, and that rough middle portions of the ununiform portions settle in the respective nodal positions of the vibrating member.

As explained above, this invention is composed of piezoelectric vibrators for generating a travelling wave for drive and at least one kind of standing wave for halt, or piezoelectric vibrators for generating a standing waves for drive and a standing wave for halt. An ultrasonic vibration generating circuit for driving respective ultrasonic motors employing each type of the piezoelectric vibrators, a switching circuit for changing the wave for drive and the wave for halt, and a movable member having a plurality of ununiform portions on the cross section in the direction of its circumference are provided. The ultrasonic vibration (the travelling wave or the standing wave) and the standing wave vibration for halt are changed by the above switching means. Therefore, this invention is suitable for accurately step-driving the movable member without any accumulated inaccuracy, even if a rotation detecting means such as an encoder is not used.

What is claimed is:

1. An ultrasonic motor having a movable member frictionally driven by ultrasonic vibration using elastic movement of a piezoelectric vibrator, the ultrasonic motor comprising:

an ultrasonic vibration generating circuit for generating a first standing wave for driving a movable member and a second standing wave for halting the movable member;

a switching circuit for changing operation of the first standing wave for driving the movable member and the second standing wave for halting the movable member;

at least one piezoelectric vibrator step-driven by the ultrasonic vibration generating circuit, the piezoelectric vibrator having electrode patterns for receiving the output signal of the switching circuit, each two adjacent electrode patterns being separated by a boundary;

a vibrating member on which the at least one piezoelectric vibrator is fixed, the vibrating member having a plurality of projections;

a movable member having a plurality of non-uniform load portions when viewed on a cross section in the direction of its circumference; and pressure regulating means for contacting the movable member with the vibrating member under pressure;

wherein when the piezoelectric vibrator generates the first standing wave, the projections are disposed at every other one of the intermediate positions between a maximum amplitude portion and a nodal portion of the first standing wave, and each of the projections is located at a boundary between two adjacent electrode patterns; and wherein when the piezoelectric vibrator generates the second standing wave, the projections are disposed at nodal portions of the second standing wave and each of the projections is located at a boundary between two adjacent electrode patterns.

2. An ultrasonic motor according to claim 1; wherein the number of the non-uniform portions of the movable member is an integral multiple of the number of crests constituting the second standing wave excited on the vibrating member.

3. An ultrasonic motor according to claim 1; comprising at least two piezoelectric vibrators which are step-driven by the ultrasonic vibration generating circuit.

4. An ultrasonic motor according to claim 2; wherein the movable member is provided with a plurality of slits extending from an upper surface to a lower surface thereof and forming said load portions.

5. An ultrasonic motor according to claim 4; wherein a friction material is bonded to the lower surface of the movable member.

6. An ultrasonic motor according to claim 4; wherein a weight is positioned on each of the load portions at the upper surface of the movable member.

7. An ultrasonic motor according to claim 2; wherein the movable member is provided with a plurality of grooves about the circumference thereof forming the load portions.

8. An ultrasonic motor according to claim 7; wherein the grooves are provided on upper and lower surfaces of the movable member in staggered relationship thereof.

9. An ultrasonic motor according to claim 2; wherein the movable member is provided with a plurality of weights about its circumference at equal intervals thereof and constituting the load portions.

10. An ultrasonic motor having a movable member frictionally driven by ultrasonic vibration using elastic movement of a piezoelectric vibrator, the ultrasonic motor comprising:

an ultrasonic vibration generating circuit for generating a first standing wave for driving a movable member and a second standing wave for halting the movable member;

a switching circuit for changing operation of the first standing wave for driving the movable member and the second standing wave for halting the movable member;

at least one piezoelectric vibrator step-driven by the ultrasonic vibration generating circuit, the piezoelectric vibrator having electrode patterns for receiving the output signal of the switching circuit, each two adjacent electrode patterns being separated by a boundary;

a vibrating member on which the at least one piezoelectric vibrator is fixed, the vibrating member having a plurality of projections;

a movable member having a plurality of non-uniform load portions when viewed on a cross section in the direction of its circumference; and pressure regulating means for contacting the movable member with the vibrating member under pressure;

wherein when the piezoelectric vibrator generates the first standing wave, the projections are disposed at every other one of the intermediate positions between a maximum amplitude portion and a nodal portion of the first standing wave and each of the projections is located at a boundary between two adjacent electrode patterns; and wherein when said piezoelectric vibrator generates the second standing wave, the projections are disposed at maximum amplitude portions of the second standing wave and each of the projections is located at a boundary between two adjacent electrode patterns.

11. An ultrasonic motor according to claim 10; wherein the number of non-uniform portions of the movable member is an integral multiple of the number of crests constituting the second standing wave excited on the vibrating member.

12. An ultrasonic motor according to claim 10; including at least two piezoelectric vibrators which are step-driven by the ultrasonic vibration generating circuit.

13. An ultrasonic motor according to claim 11; wherein the movable member is provided with a plurality of slits extending from an upper surface to a lower surface thereof and forming the load portions.

14. An ultrasonic motor according to claim 13; wherein a friction material is bonded to the lower surface of the movable member.

15. An ultrasonic motor according to claim 13; wherein a weight is positioned on each of the load portions at the upper surface of the movable member.

16. An ultrasonic motor according to claim 11; wherein the movable member is provided with a plurality of grooves about the circumference thereof forming the load portions.

17. An ultrasonic motor according to claim 16; wherein the grooves are provided on upper and lower surfaces of the movable member in staggered relationship thereof.

18. An ultrasonic motor according to claim 11; wherein the movable member is provided with a plurality of weights about its circumference at equal intervals thereof and constituting the load portions.

* * * * *